United States Patent
Nishino et al.

(10) Patent No.: US 8,069,333 B2
(45) Date of Patent: Nov. 29, 2011

(54) CONVERTING LOGICAL TO REAL NUMBER TO ACCESS SHARED CONFIGURATION INFORMATION IN EVENT DRIVEN STATE TRANSITING RECONFIGURABLE SYSTEM

(75) Inventors: Kengo Nishino, Tokyo (JP); Nobuki Kajihara, Tokyo (JP); Takeshi Inuo, Tokyo (JP)

(73) Assignee: NEC Corporation, Tokyo (JP)

( * ) Notice: Subject to any disclaimer, the term of this patent is extended or adjusted under 35 U.S.C. 154(b) by 565 days.

(21) Appl. No.: 12/296,093

(22) PCT Filed: Mar. 22, 2007

(86) PCT No.: PCT/JP2007/055829
§ 371 (c)(1),
(2), (4) Date: Oct. 3, 2008

(87) PCT Pub. No.: WO2007/114059
PCT Pub. Date: Oct. 11, 2007

(65) Prior Publication Data
US 2009/0119491 A1    May 7, 2009

(30) Foreign Application Priority Data

Apr. 5, 2006 (JP) .................................. 2006-103987
Mar. 12, 2007 (JP) .................................. 2007-061934

(51) Int. Cl.
*G06F 15/76* (2006.01)
*G06F 9/302* (2006.01)
(52) U.S. Cl. .............................. 712/15; 712/37; 712/221
(58) Field of Classification Search .................. None
See application file for complete search history.

(56) References Cited

U.S. PATENT DOCUMENTS
2010/0223596 A1*  9/2010  Inuo et al. ........................... 717/108

FOREIGN PATENT DOCUMENTS
JP    07-105098    4/1995
JP    11-306015    11/1999
(Continued)

OTHER PUBLICATIONS

Amano, H., et al., "A Dynamically Adaptive Hardware on Dynamically Reconfigurable Processor", IEICE Transactions, Jan. 2003, pp. 3385-3391, vol. E00A, No. 1.

(Continued)

*Primary Examiner* — Kenneth Kim
(74) *Attorney, Agent, or Firm* — Scully, Scott, Murphy & Presser, P.C.

(57) ABSTRACT

A data processing device comprises a state manager for determining a logic number of configurational information to be used in a next state, the logic number representing information on a mutual relationship between items of configurational information included in an object code, based on a present operational state, a group of candidates for a state to transit to next, and an event signal issued from arithmetic units, a configuration number converter for outputting a real number corresponding to the logic number determined by the state manager, the configuration number converter having conversion information for converting the logic number into a real number representing a location where the corresponding configurational information is actually stored, and a configurational information storage for storing the configurational information and indicating configurational information corresponding to the real number output from the configuration number converter, to the arithmetic units and an interconnector.

17 Claims, 22 Drawing Sheets

FOREIGN PATENT DOCUMENTS

| | | |
|---|---|---|
| JP | 2000-138579 | 5/2000 |
| JP | 2000-224025 | 8/2000 |
| JP | 2000-232162 | 8/2000 |
| JP | 2000-232354 | 8/2000 |
| JP | 2000-311156 | 11/2000 |
| JP | 2003-076668 | 3/2003 |
| JP | 2003-099409 | 4/2003 |
| JP | 2003-196248 | 7/2003 |
| JP | 2003-198362 | 7/2003 |
| JP | 2003-288203 | 10/2003 |
| JP | 2005-222141 | 8/2005 |
| JP | 2005-222142 | 8/2005 |
| JP | 2006-018515 | 1/2006 |

OTHER PUBLICATIONS

International Preliminary Report on Patentability dated Nov. 27, 2008.

* cited by examiner

[Fig. 3]
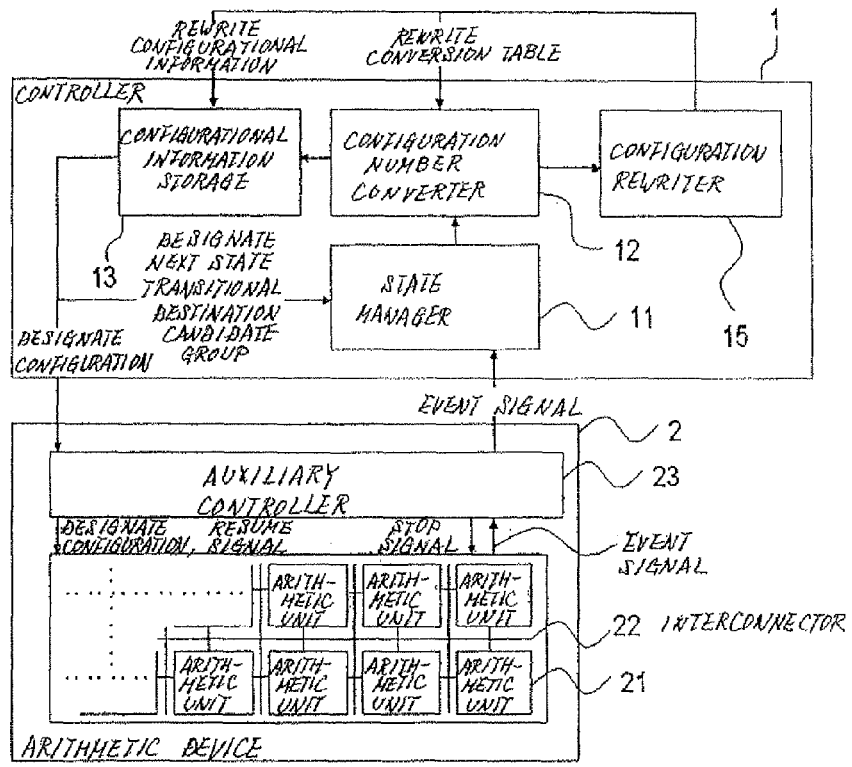
[Fig. 4]
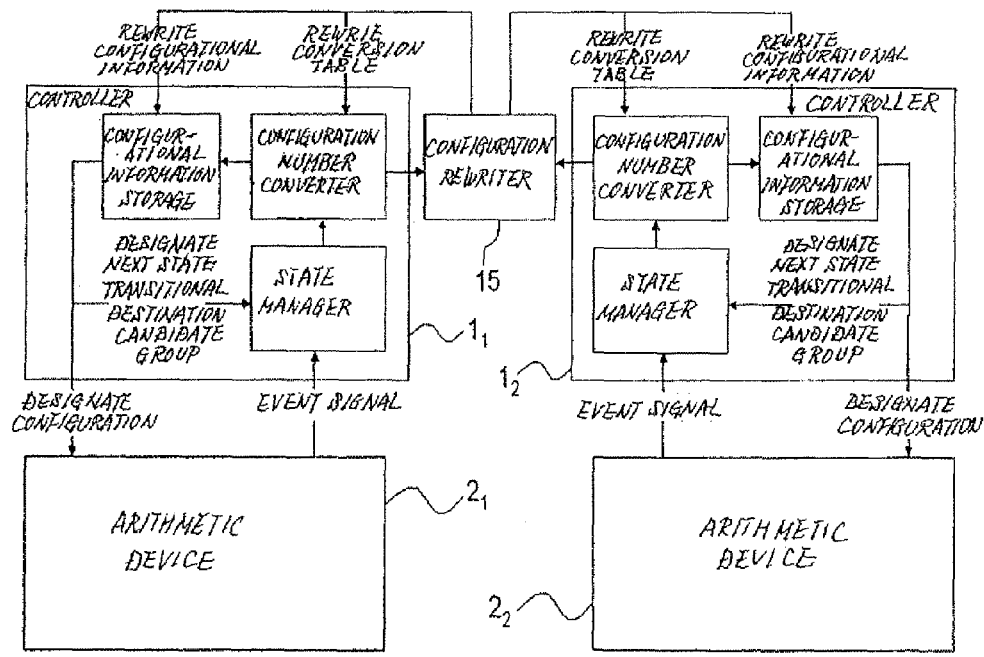

[Fig. 5]
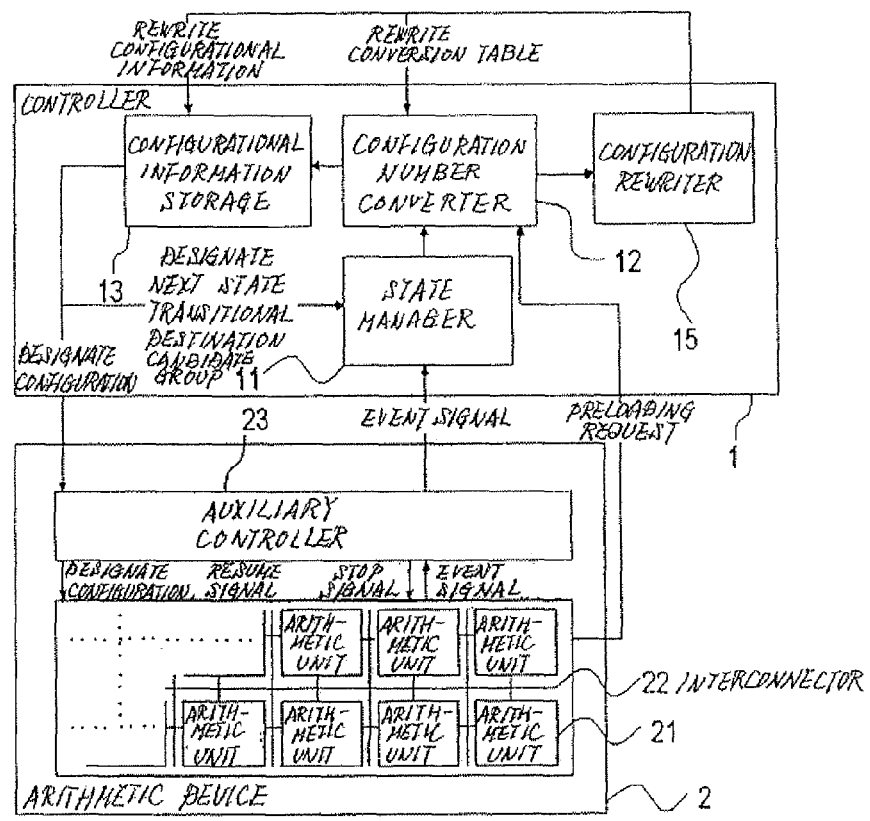

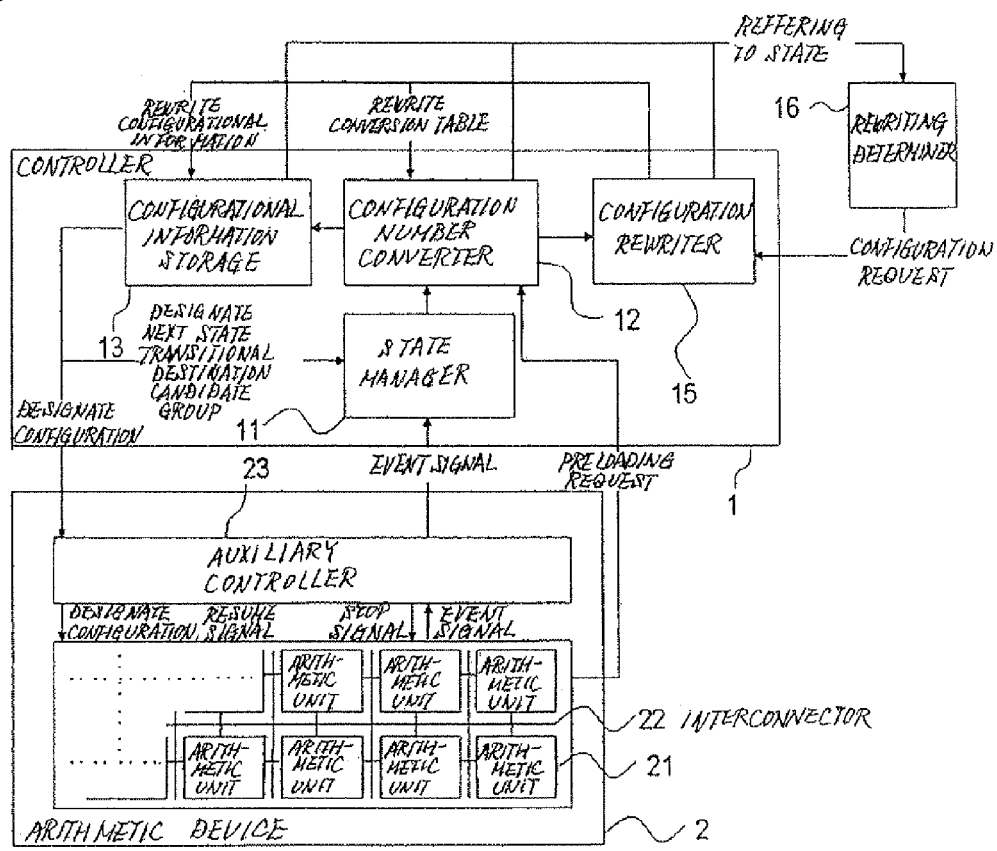

[Fig. 7]
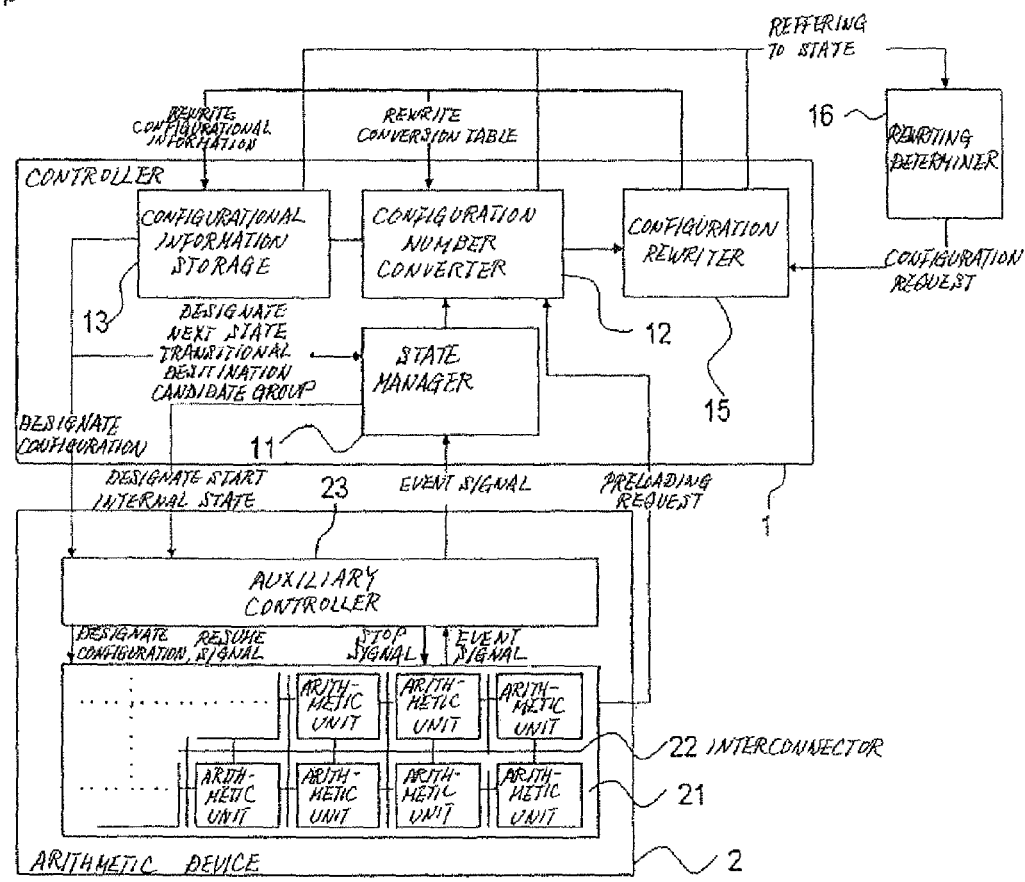

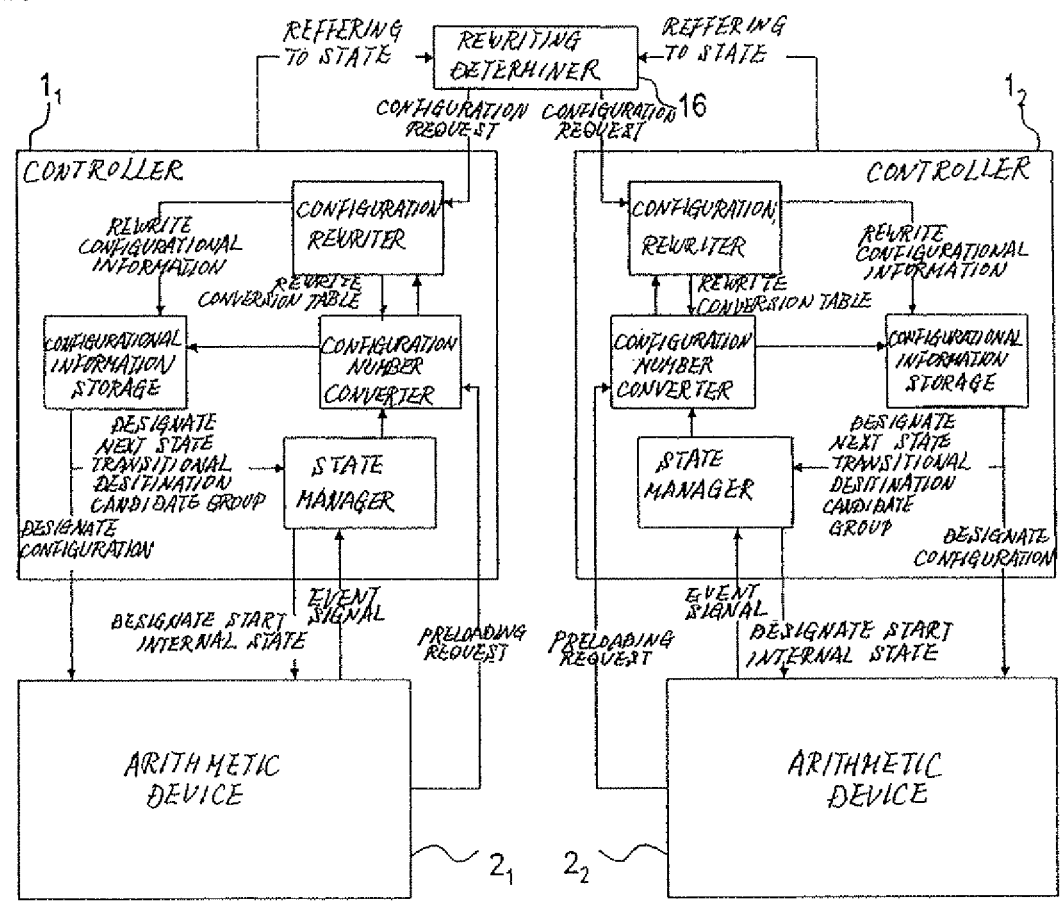
[Fig.8]

[Fig. 9]
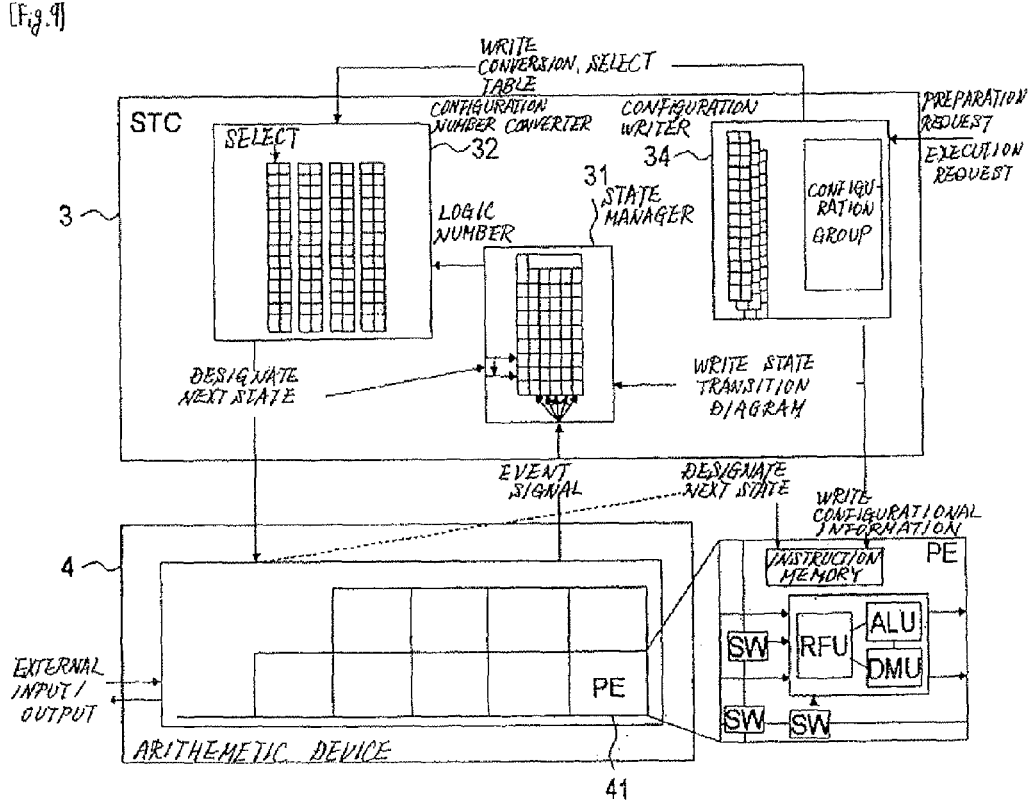
[Fig. 10]
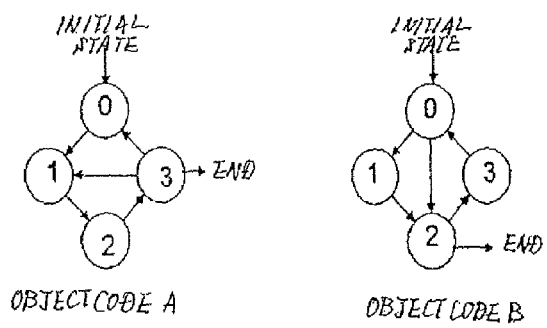
OBJECT CODE A   OBJECT CODE B

[Fig. 11]
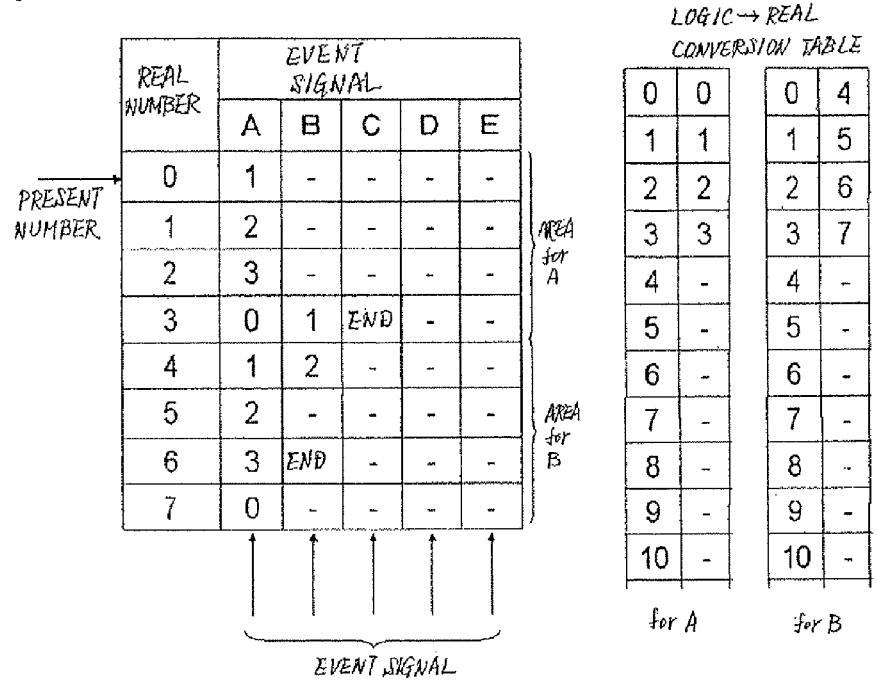
[Fig. 12]
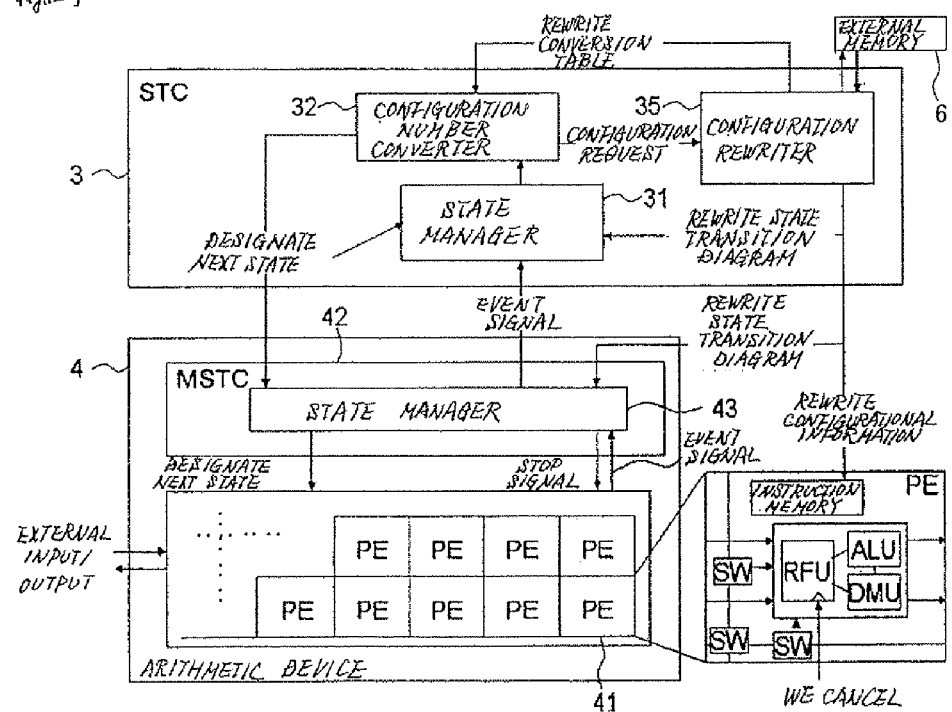

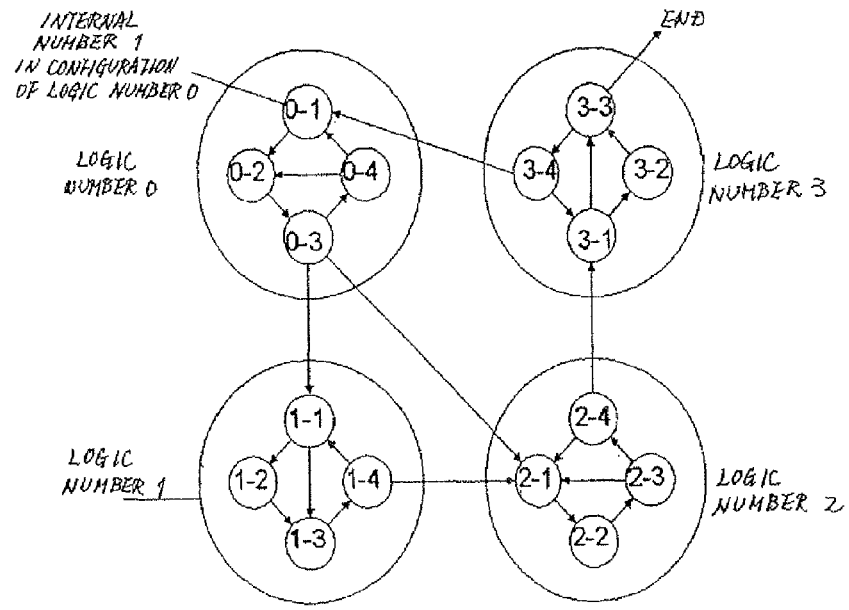

[Fig. 15]
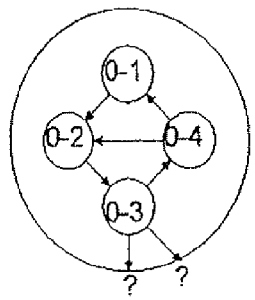
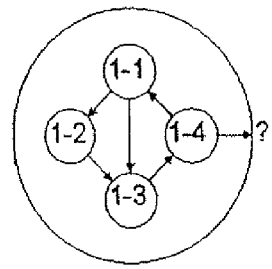
[Fig. 16]
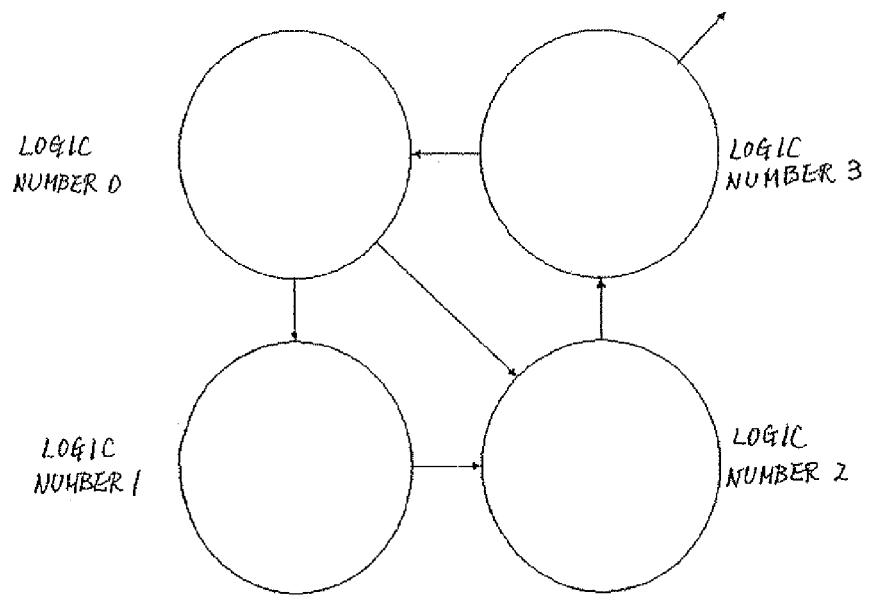

[Fig.17]
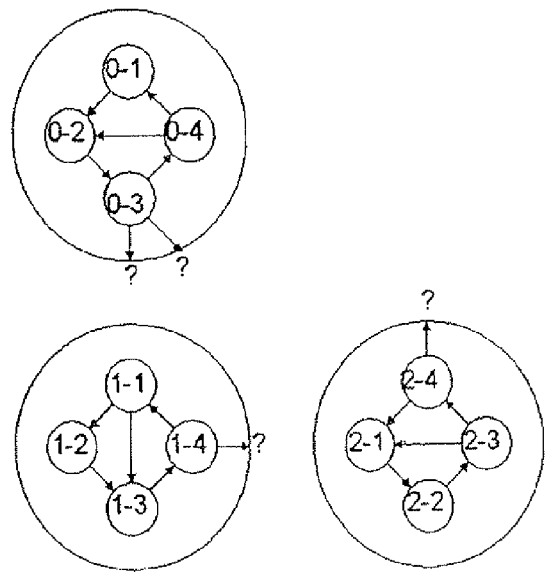
[Fig.18]
| REAL NUMBER | EVENT SIGNAL | | | | |
|---|---|---|---|---|---|
| | A | B | C | D | E |
| 0 | 3 | - | - | - | - |
| 1 | X | X | X | X | X |
| 2 | X | X | X | X | X |
| 3 | X | X | X | X | X |
| 4 | X | X | X | X | X |
| 5 | X | X | X | X | X |
| 6 | 1 | 2 | - | - | - |
| 7 | 2 | - | - | - | - |
PRESENT NUMBER
EVENT SIGNAL
LOGIC → REAL
| 0 | 6 |
|---|---|
| 1 | 7 |
| 2 | 0 |
| 3 | ? |
| 4 | ? |
| 5 | ? |
| 6 | ? |
| 7 | ? |
| 8 | ? |
| 9 | ? |
| 10 | ? |

[Fig.19]
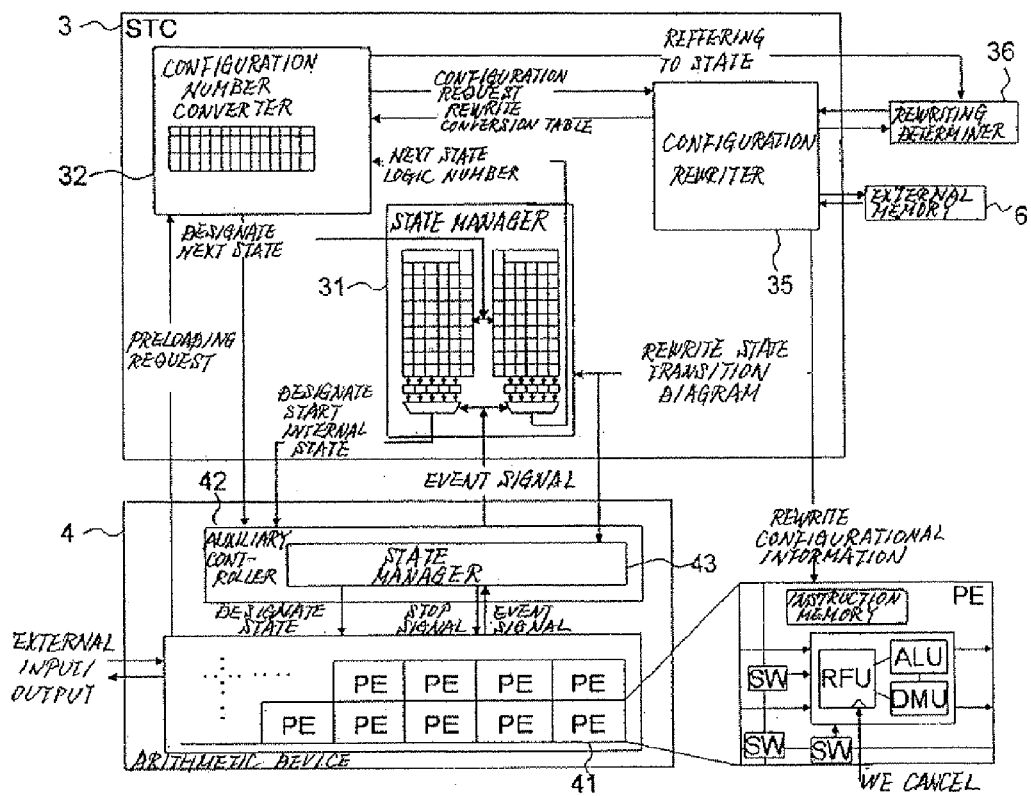
[Fig.20]
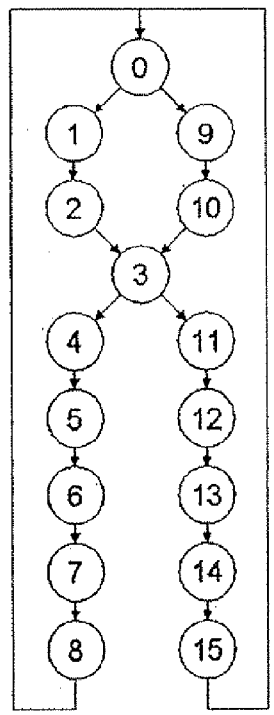

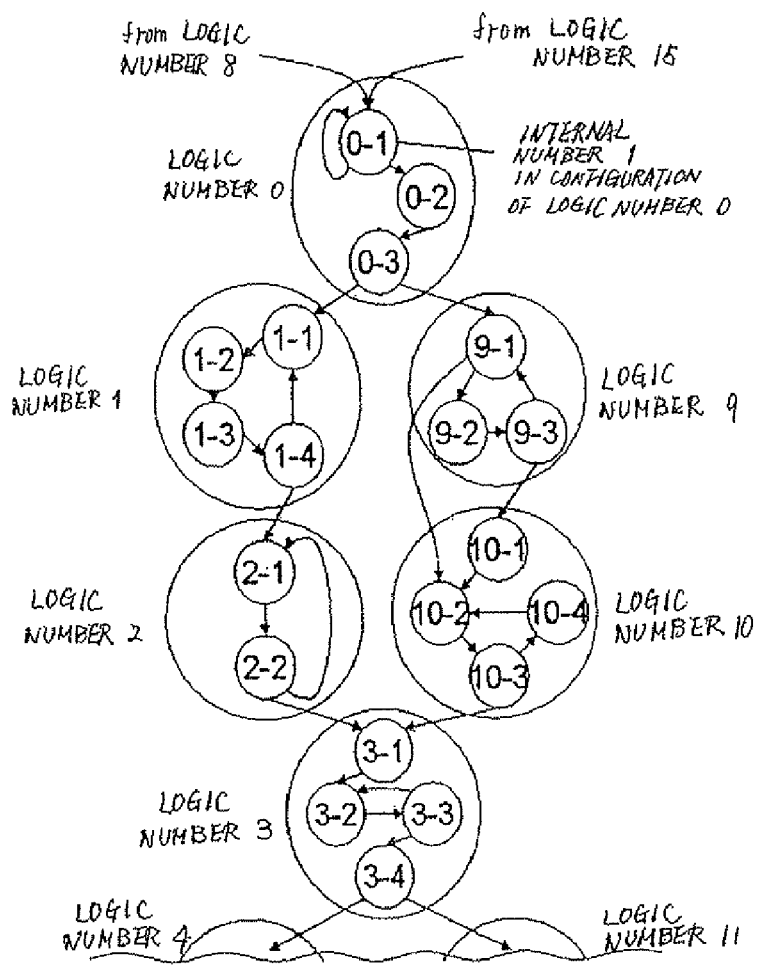
[Fig.21]

[Fig.22]
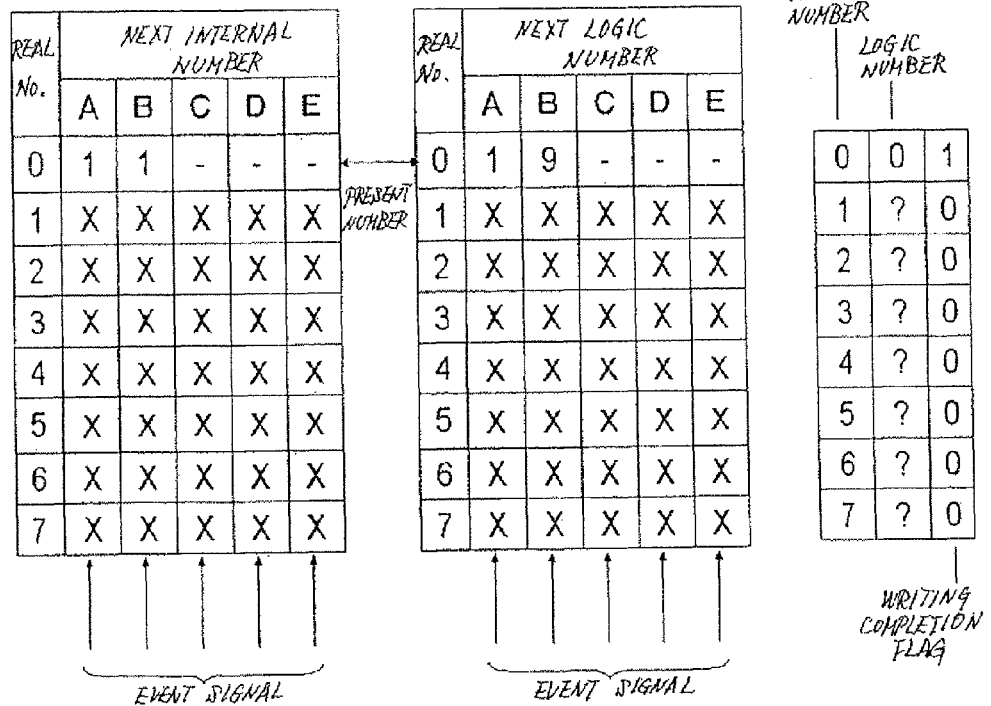
[Fig.23a]
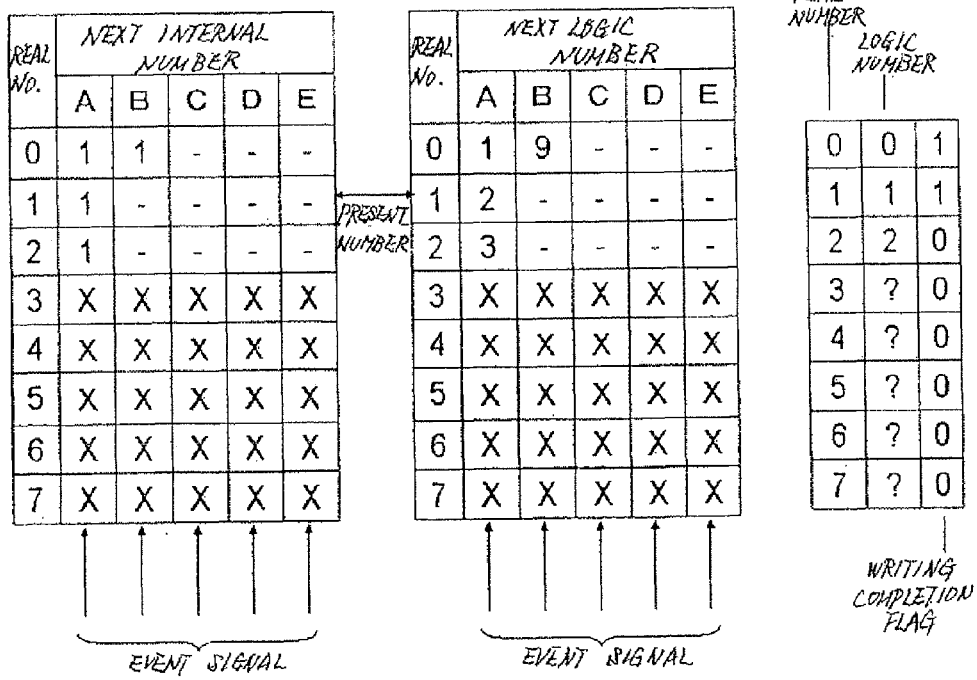

[Fig.23b]

| REAL No. | NEXT INTERNAL NUMBER | | | | |
|---|---|---|---|---|---|
| | A | B | C | D | E |
| 0 | 1 | 1 | - | - | - |
| 1 | 1 | - | - | - | - |
| 2 | 1 | - | - | - | - |
| 3 | 1 | 1 | - | - | - |
| 4 | 1 | - | - | - | - |
| 5 | X | X | X | X | X |
| 6 | X | X | X | X | X |
| 7 | X | X | X | X | X |

↑↑↑↑↑ EVENT SIGNAL

| REAL No. | NEXT LOGIC NUMBER | | | | |
|---|---|---|---|---|---|
| | A | B | C | D | E |
| 0 | 1 | 9 | - | - | - |
| 1 | 2 | - | - | - | - |
| 2 | 3 | - | - | - | - |
| 3 | 4 | 11 | - | - | - |
| 4 | 5 | - | - | - | - |
| 5 | X | X | X | X | X |
| 6 | X | X | X | X | X |
| 7 | X | X | X | X | X |

↑↑↑↑↑ EVENT SIGNAL

←PRESENT NUMBER→

| REAL NUMBER | LOGIC NUMBER | |
|---|---|---|
| 0 | 0 | 1 |
| 1 | 1 | 1 |
| 2 | 2 | 1 |
| 3 | 3 | 1 |
| 4 | 4 | 0 |
| 5 | ? | 0 |
| 6 | ? | 0 |
| 7 | ? | 0 |

WRITING COMPLETION FLAG

[Fig.23c]

| REAL No. | NEXT INTERNAL NUMBER | | | | |
|---|---|---|---|---|---|
| | A | B | C | D | E |
| 0 | 1 | 1 | - | - | - |
| 1 | 1 | - | - | - | - |
| 2 | 1 | - | - | - | - |
| 3 | 1 | 1 | - | - | - |
| 4 | 1 | - | - | - | - |
| 5 | 1 | - | - | - | - |
| 6 | 1 | - | - | - | - |
| 7 | 1 | - | - | - | - |

↑↑↑↑↑ EVENT SIGNAL

| REAL No. | NEXT LOGIC NUMBER | | | | |
|---|---|---|---|---|---|
| | A | B | C | D | E |
| 0 | 1 | 9 | - | - | - |
| 1 | 2 | - | - | - | - |
| 2 | 3 | - | - | - | - |
| 3 | 4 | 11 | - | - | - |
| 4 | 5 | - | - | - | - |
| 5 | 6 | - | - | - | - |
| 6 | 7 | - | - | - | - |
| 7 | 8 | - | - | - | - |

↑↑↑↑↑ EVENT SIGNAL

←PRESENT NUMBER→

| REAL NUMBER | LOGIC NUMBER | |
|---|---|---|
| 0 | 0 | 1 |
| 1 | 1 | 1 |
| 2 | 2 | 1 |
| 3 | 3 | 1 |
| 4 | 4 | 1 |
| 5 | 5 | 1 |
| 6 | 6 | 1 |
| 7 | 7 | 1 |

WRITING COMPLETION FLAG

[Fig.23d]
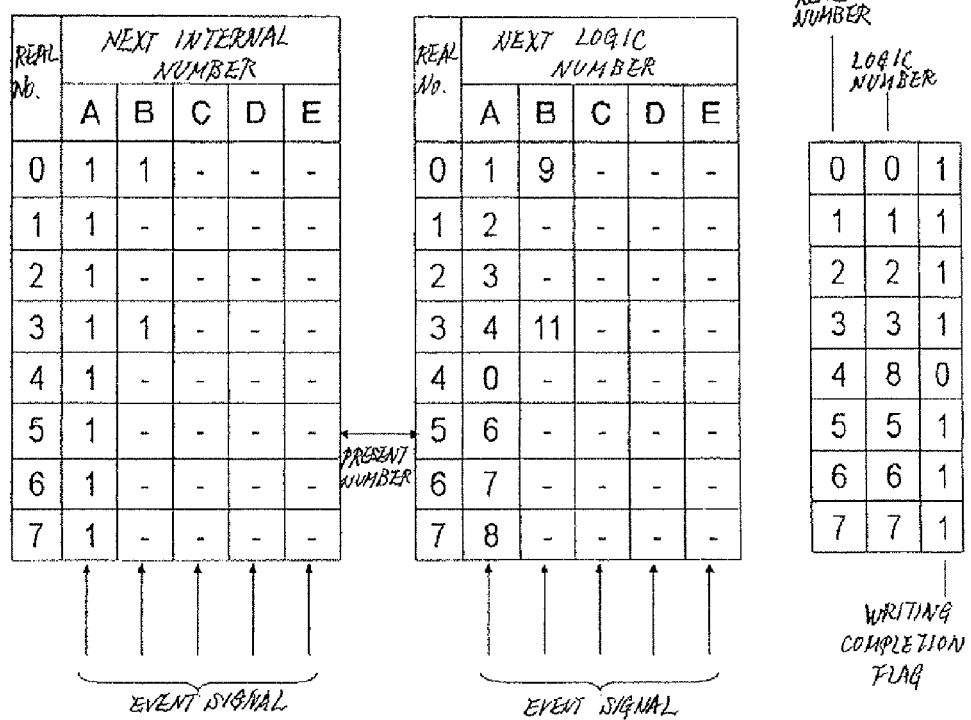

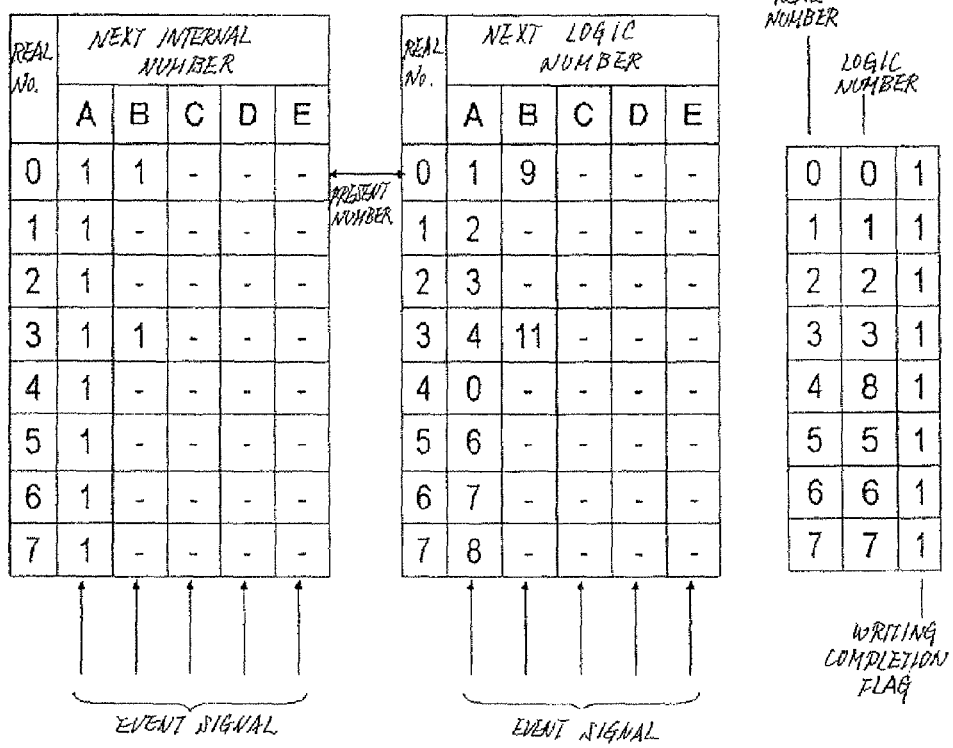
[Fig.23e]

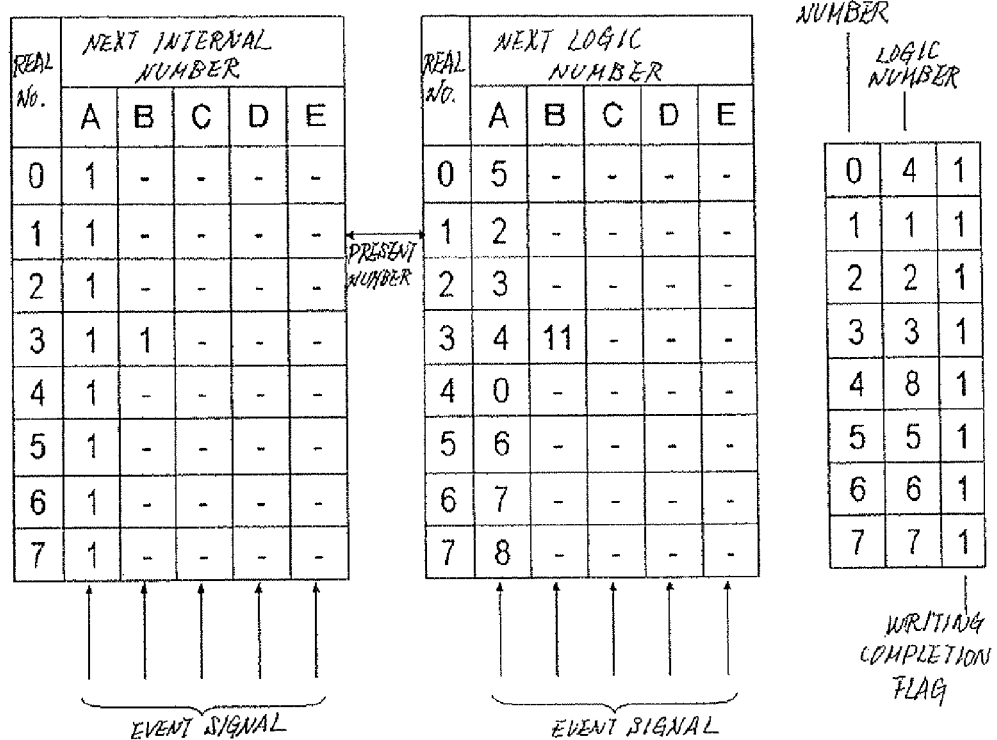

Fig.238
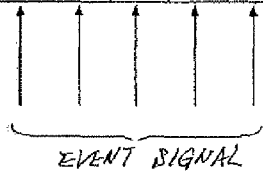
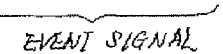

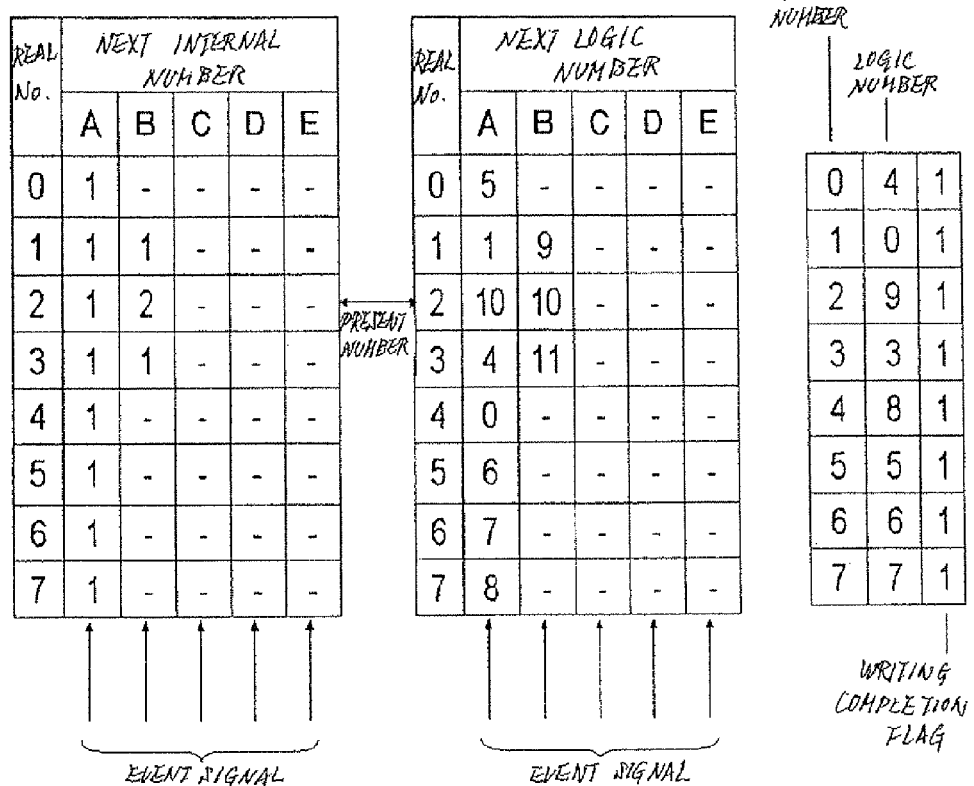

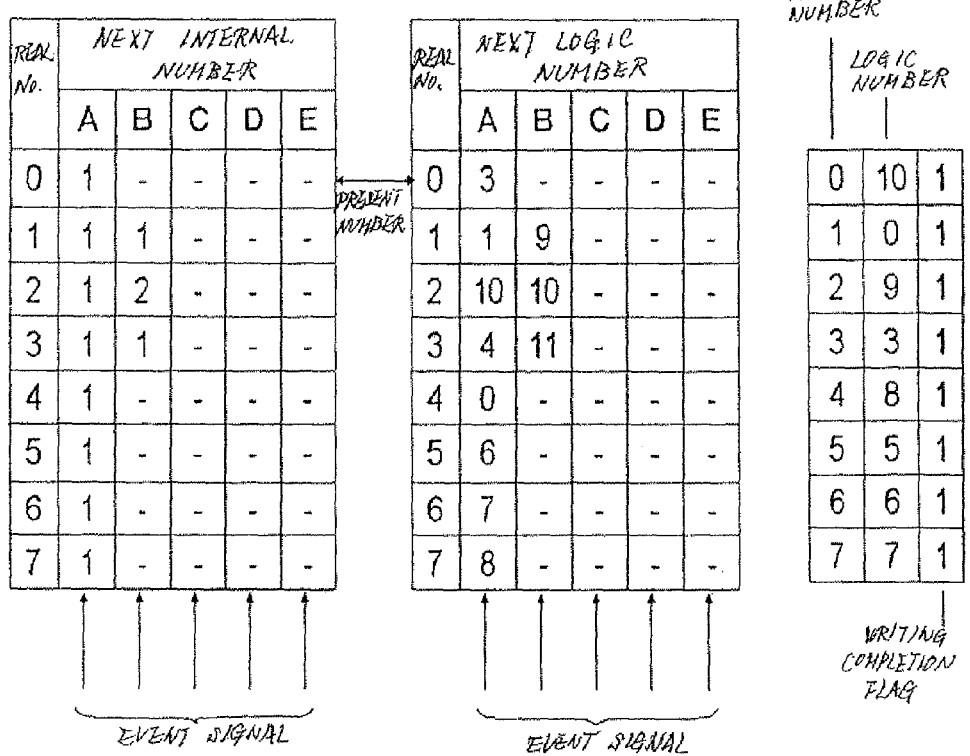
[Fig.23D]

CONVERTING LOGICAL TO REAL NUMBER TO ACCESS SHARED CONFIGURATION INFORMATION IN EVENT DRIVEN STATE TRANSITING RECONFIGURABLE SYSTEM

TECHNICAL FIELD

The present invention relates to a data processing device comprising a reconfigurable device for changing a circuit for performing a predetermined process.

BACKGROUND ART

Information processing apparatus have been finding wider use and have been required to have an ability to perform sophisticated arithmetic processing and to process a large amount of data such as of images and moving pictures at a high speed. There has heretofore been known an arrangement including, in addition to a host processor, a DSP (Digital Signal Processor) or an ASIC (Application Specific Integrated Circuit) dedicated to certain arithmetic operations and processing operations for reducing the processing burden on the host processor, namely a CPU or the like, to increase the processing capability of an information processing apparatus.

In recent years, information processing apparatus have been required to perform compressing/expanding processes and arithmetic processing operations according to various standards on multimedia data such as of images, moving pictures, speech, music, etc., and various protocols have been used for communication processes for sending and receiving various data via networks such as the Internet, etc. Furthermore, concern over the security of information sent and received over networks has resulted in needs for encrypting processes for information security and decrypting processes for decrypting encrypted information. If the information processing apparatus incorporate many DSPs and ASICs for performing such processes, then the information processing apparatus will be large in circuit scale and cost.

There has been known an arrangement wherein an information processing apparatus incorporates a data processing device comprising a reconfigurable device such as an FPGA (Field Programmable Gate Array), a CPLD (Complex Programmable Logic Device), or a DRP (Dynamically Reconfigurable Processor), and, when necessary, the program in the data processing device is rewritten to process data for thereby increasing the throughput of the information processing apparatus, reducing the cost thereof, and meeting various processing demands.

The reconfigurable device includes an internal memory for storing programs (object codes) therein. Under the control of a CPU, object codes stored in an external memory are loaded into the internal memory, and a circuit is configured in the reconfigurable device according to the loaded object codes for processing data input to the circuit.

Details of the DRP are disclosed, for example, in Patent document 1 (Japanese Patent Laid-Open No. 2000-138579), Patent document 2 (Japanese Patent Laid-Open No. 2000-224025), Patent document 3 (Japanese Patent Laid-Open No. 2000-232354), Patent document 4 (Japanese Patent Laid-Open No. 2000-232162), Patent document 5 (Japanese Patent Laid-Open No. 2003-076668), Patent document 6 (Japanese Patent Laid-Open No. 2003-099409), Non-patent document 1 (Hideharu Amano, Akiya Jouraku, Kenichiro Anjo, "A Dynamically Adaptive Hardware on Dynamically Reconfigurable Processor", IEICE Transactions, Vol. E86-B, No. 12, pp. 3385-3391, 2003). The DRP comprises an arithmetic device for performing arithmetic operations and a controller for controlling the operation of the arithmetic device. The arithmetic device comprises a plurality of small-scale arithmetic units and an interconnection device for changing connections between the arithmetic units.

The DRP is capable of performing various types of processing operations. For example, while the DRP is performing a processing operation, it may read other data from a memory and continue the processing operation using the read data. Though the DRP has an internal memory, the internal memory often has a limited storage capacity. Therefore, when the DRP needs to refer to a table or data which requires a large storage capacity while the DRP is performing a processing operation, it is necessary to access a memory which stores the table or the data. A processing method for such memory access is disclosed, for example, in Patent document 7 (Japanese Patent Laid-Open No. 2005-222141) and Patent document 8 (Japanese Patent Laid-Open No. 2005-222142).

For performing a processing operation based on an object code made up of one or more configurational information generated depending on data to be processed, the data processing device of the background art employs a method of performing the processing operation by directly designating the position of the configurational information that is stored in the data processing device.

The configurational information refers to information required to hypothetically configure a circuit in the data processing device, including arithmetic instructions for arithmetic units at a certain time, information representative of the connected relationship between the arithmetic units in the interconnection device, and information representative of the relationship between an event signal and configuration information to be selected next depending on the event signal. The object code indicates a set of configurational information required to perform a desired processing operation.

According to the above method, however, when a plurality of object codes are installed in the data processing device, if the stored positions of the configurational information of the object codes overlap each other, then the object codes need to be combined again so that they will not overlap each other.

If a plurality of object codes or a large-sized object code is installed in the data processing device beyond the number of items of configurational information that can be held by the data processing device, then the data processing device needs to perform a series of processing operations including shutdown, replacement of the object code or codes that have been held, and restart. In order to perform such operations, the data processing device requires an external processing unit such as an MPU or the like. Since the data processing device of the background art can have configurational information installed only in the location determined at the time the object codes are combined, if configurational information made up of codes having the same function is to be installed in a different location, then it is necessary to prepare a plurality of items of configurational information made up of is codes having the same function. As the configurational information cannot be shared, the data processing device has been problematic in that its processing operations tend to be slow because the data processing device holds a plurality of items of identical configurational information and rewrites the same configurational information.

SUMMARY

It is an object of the present invention to provide a data processing device which is free of limitations on storage locations for configurational information and which is capable of sharing configurational information.

To achieve the above object, a data processing device according to the present invention comprises a state manager for determining a logic number of configurational information to be used in a next state, the logic number representing information on a mutual relationship between items of configurational information included in an object code, based on a present operational state, a group of candidates for a state to transit to next, and an event signal issued from arithmetic units, a configuration number converter for outputting a real number corresponding to the logic number determined by the state manager, the configuration number converter having conversion information for converting the logic number into a real number representing a location where the corresponding configurational information is actually stored, and a configurational information storage for storing the configurational information and indicating configurational information corresponding to the real number output from the configuration number converter, to the arithmetic units and an interconnector.

With the above arrangement, configurational information included in object codes is represented by logic numbers. Even if the logic numbers of the configurational information included in the object codes overlap each other, the configuration number converter converts the logic numbers into respective corresponding real numbers. Accordingly, the data processing device is essentially free of limitations on storage locations for configurational information. Since configurational information included in object codes is represented by logic numbers, even if a plurality of object codes have the same configurational information, the object codes can share the configurational information therebetween by assigning the configurational information to a certain real number. As the object codes can designate the same configurational information, the data processing device is not subject to limitations on storage locations for configurational information, and can share configurational information.

BRIEF DESCRIPTION OF THE DRAWINGS

FIG. 3 is a block diagram showing a configuration of a data processing device according to a third exemplary embodiment of the present invention.

FIG. 4 is a block diagram showing a configuration of a data processing device according to a fourth exemplary embodiment of the present invention.

FIG. 5 is a block diagram showing a configuration of a data processing device according to a fifth exemplary embodiment of the present invention.

FIG. 6 is a block diagram showing a configuration of a data processing device according to a sixth exemplary embodiment of the present invention.

FIG. 7 is a block diagram showing a configuration of a data processing device according to a seventh exemplary embodiment of the present invention.

FIG. 8 is a block diagram showing a configuration of a data processing device according to an eighth exemplary embodiment of the present invention.

FIG. 9 is a block diagram showing a configuration of a data processing device according to a first example of the present invention.

FIG. 10 is a diagram of state transitions showing an example of object codes processed by the data processing device shown in FIG. 9.

FIG. 11 is a diagram showing an example of a conversion table used by the data processing device shown in FIG. 9.

FIG. 12 is a block diagram showing a configuration of a data processing device according to a second example of the present invention.

FIG. 13 is a diagram of state transitions showing an example of object codes processed by the data processing device shown in FIG. 12.

FIG. 14 is a diagram showing an example of a conversion table used by the data processing device shown in FIG. 12.

FIG. 15 is a diagram showing an example of state transitions saved by an auxiliary controller shown in FIG. 12.

FIG. 16 is a diagram showing an example of state transitions saved by a state transition manager shown in FIG. 12.

FIG. 17 is a diagram showing an example of state transitions held by the auxiliary controller after configurational information is rewritten by a configuration rewriter shown in FIG. 12.

FIG. 18 is a diagram showing an example of a conversion table held by a configuration number converter after configurational information is rewritten by the configuration rewriter shown in FIG. 12.

FIG. 19 is a block diagram showing a configuration of a data processing device according to a third example of the present invention.

FIG. 20 is a diagram of state transitions showing an example of object codes processed by a state transition manager of the data processing device shown in FIG. 19.

FIG. 21 is a diagram of state transitions showing states transitions in the state shown in FIG. 19.

FIG. 22 is a diagram showing an example of a conversion table used by the data processing device shown in FIG. 19.

FIG. 23a is a diagram showing an example of a conversion table held by a state manager and a configuration number converter after configurational information is rewritten by a configuration rewriter shown in FIG. 19.

FIG. 23b is a diagram showing an example of a conversion table held by the state manager and the configuration number converter after configurational information is rewritten by the configuration rewriter shown in FIG. 19.

FIG. 23c is a diagram showing an example of a conversion table held by the state manager and the configuration number converter after configurational information is rewritten by the configuration rewriter shown in FIG. 19.

FIG. 23d is a diagram showing an example of a conversion table held by the state manager and the configuration number converter after configurational information is rewritten by the configuration rewriter shown in FIG. 19.

FIG. 23e is a diagram showing an example of a conversion table held by the state manager and the configuration number converter after configurational information is rewritten by the configuration rewriter shown in FIG. 19.

FIG. 23f is a diagram showing an example of a conversion table held by the state manager and the configuration number converter after configurational information is rewritten by the configuration rewriter shown in FIG. 19.

FIG. 23g is a diagram showing an example of a conversion table held by the state manager and the configuration number converter after configurational information is rewritten by the configuration rewriter shown in FIG. 19.

FIG. 23h is a diagram showing an example of a conversion table held by the state manager and the configuration number converter after configurational information is rewritten by the configuration rewriter shown in FIG. 19.

FIG. 23i is a diagram showing an example of a conversion table held by the state manager and the configuration number converter after configurational information is rewritten by the configuration rewriter shown in FIG. 19.

EXEMPLARY EMBODIMENT

Figure 1:
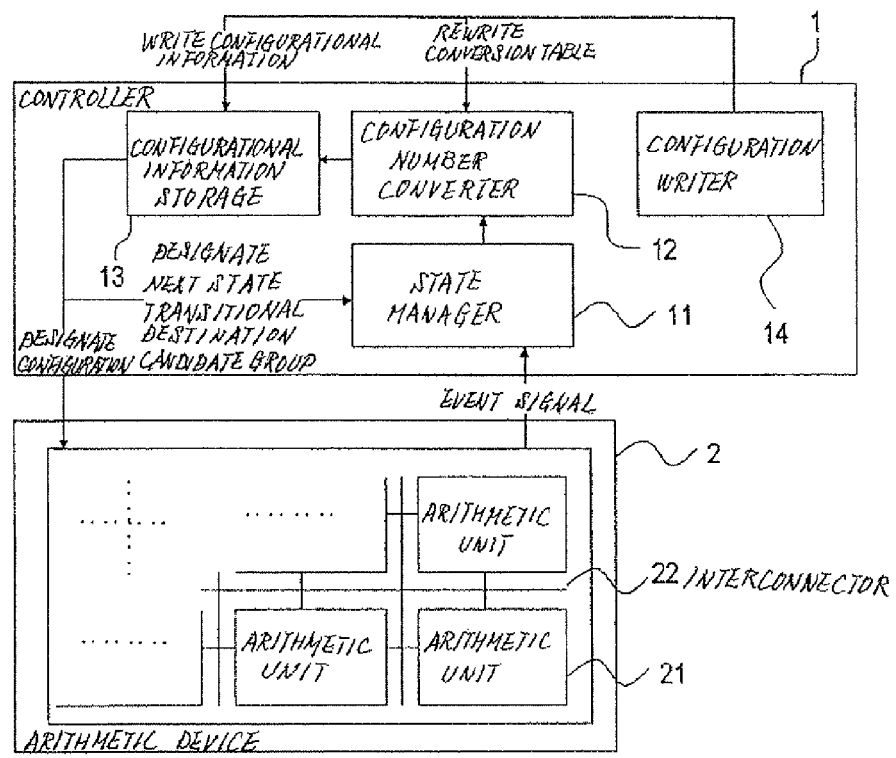
FIG. 1 is a block diagram showing a configuration of a data processing device according to a first exemplary embodiment of the present invention.

Next, an exemplary embodiment of the present invention will be described with reference to the drawing.

1st Exemplary Embodiment)

FIG. 1 is a block diagram showing a configuration of a data processing device according to a first exemplary embodiment of the present invention.

The data processing device according to the first exemplary embodiment comprises controller 1 and arithmetic unit 2.

Controller 1 comprises state manager 11, configuration number converter 12, configurational information storage 13, and configuration writer 14. Arithmetic device 2 comprises a plurality of arithmetic units 21 connected by interconnector 22.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12.

The logic number represents the information of the mutual relationship of configurational information included in an object code, and has an real number representing the position where the configurational information is stored in configurational information storage 13.

Configuration number converter 12 converts the logic number of the configurational information indicated by state manager 11 into a real number of the corresponding configurational information stored in configurational information storage 13, and indicates the real number of the configurational information to configurational information storage 13 (configuration designation).

Configurational information storage 13 holds object is codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Configuration writer 14 writes configurational information in configurational information storage 13 when the data processing device is activated.

Arithmetic units 21 perform an arithmetic operation according to the configurational information designated by configurational information storage 13 in each of a plurality of operational states that are successively transited one from the other.

Interconnector 22 changes connections between arithmetic units 21 based on the configurational information indicated by configurational information storage 13. Arithmetic device 2 issues an event signal depending on the result of the arithmetic operation to state manager 11.

Each of the above components does not need to be provided independently in terms of the function shown in FIG. 1. For example, any arbitrary component may be included in another component, and may comprise a plurality of parts.

For example, configurational information storage 13 may be divided into parts which may be provided respectively in state manager 11, arithmetic units 21, and interconnector 22. All of the above components do not need to be provided in one device. For example, configuration writer 14 may be implemented as another external device or an MPU or the like.

Configurational information includes an arithmetic instruction for arithmetic units 21 at a certain time, information representative of connections of arithmetic units 21 provided by interconnector 22, and information representative of the relationship between an event signal and the logic number of configurational information to be selected next depending on the event signal.

Each arithmetic unit 21 may comprise a single arithmetic logic unit (ALU) or the like, or a combination of plurality arithmetic units and a storage device such as a register.

State manager 11 may be of any configurations insofar as they can determine a state to transit to next based on the present state and the event signal. State manager 11 may have, for example, a mapping table representing the transitions between states.

Configuration number converter 12 may be of any configurations insofar as they can convert the logic number of the configurational information designated by state manager 11 into a real number. For example, configuration number converter 12 may have a mapping table representing the mapping relationship between logic numbers and real numbers, or a mechanism for converting a logic number into a real number based on the relative values of logic numbers and real numbers. The mapping table and relative values required for configuration number converter 12 to convert a logic number into a real number will be referred to as "conversion information".

The above requirements with respect to the components are applicable to not only the first exemplary embodiment, but also second through fourth exemplary embodiments to be described below.

Since the data processing device according to the present exemplary embodiment includes configuration number converter 12 for converting the logic number of the configurational information indicated by state manager 11 into the real number of the corresponding configurational information that is stored in configurational information storage 13, the data processing device is not subject to limitations on storage locations for configurational information and is not required to generate the same configurational information even if a plurality of object codes are to be stored. The above advantages manifest themselves particularly when a plurality of object codes are to be stored simultaneously.

2nd Exemplary Embodiment

Figure 2:
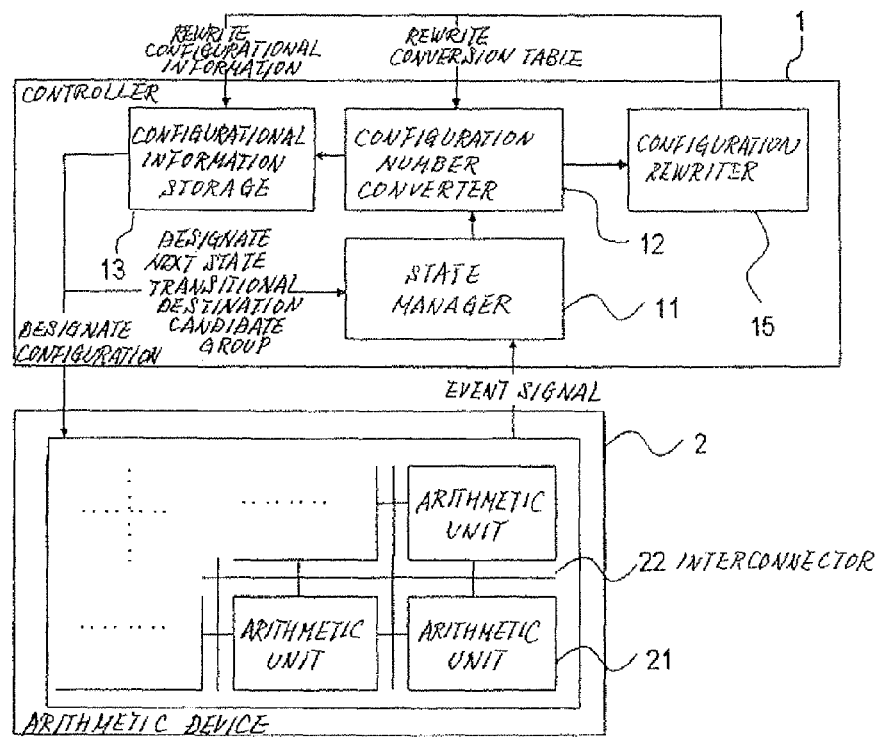
FIG. 2 is a block diagram showing a configuration of a data processing device according to a second exemplary embodiment of the present invention.

FIG. 2 is a block diagram showing a configuration of a data processing device according to a second exemplary embodiment of the present invention.

The data processing device according to the second exemplary embodiment differs from the first exemplary embodiment in that it has configuration rewriter 15 instead of configuration writer 14 according to the first exemplary embodiment, and a signal path is added from configuration number converter 12 to configuration rewriter 15.

As with the first exemplary embodiment, the data processing device according to the second exemplary embodiment comprises controller 1 and arithmetic unit 2.

Controller 1 comprises state manager 11, configuration number converter 12, configurational information storage 13, and configuration rewriter 15. Arithmetic device 2 comprises a plurality of arithmetic units 21 connected by interconnector 22.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 designates the real number of the next configurational information. If next configurational information is not stored in configurational information storage 13, then configuration number converter 12 issues a rewriting request to configuration rewriter 15.

Configuration rewriter 15 writes configurational information in configurational information storage 13 when the data processing device is initially activated. When configuration number converter 12 issues a rewriting request, configuration rewriter 15 rewrites the configurational information that is not wanted at the present time, among the configurational information stored in configurational information storage 13, into configurational information designated upon the rewriting request. Configuration rewriter 15 also updates conversion information required for configuration number converter 12 to convert a logic number into a real number. Configuration rewriter 15 may employ a known process such as Least Recently Used (LRU) process or the like, for example, for the selection of the unwanted configurational information.

Configuration rewriter 15 basically rewrites a single item of configurational information requested by a rewriting request. However, configuration rewriter 15 may also rewrite configurational information to be subsequently used as well as the requested configurational information.

Configurational information storage 13 holds object codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Arithmetic units 21 perform an arithmetic operation according to the configurational information designated by configurational information storage 13 in each of a plurality of operational states that are successively transited one from the other. Interconnector 22 changes connections between arithmetic units 21 based on the configurational information indicated by configurational information storage 13. Arithmetic units 21 and interconnector 22 issue an event signal depending on the result of the arithmetic operation to state manager 11.

The data processing device according to the present exemplary embodiment is not subject to limitations on storage locations for configurational information and is not required to generate the same configurational information even if a plurality of object codes are to be stored. The above advantages manifest themselves particularly when a plurality of object codes are to be stored simultaneously.

In addition, the configuration rewriter makes it possible to use an object code comprising configurational information in excess of a memory capacity that is capable of holding it.

3rd Exemplary Embodiment

FIG. 3 is a block diagram showing a configuration of a data processing device according to a third exemplary embodiment of the present invention.

The data processing device according to the third exemplary embodiment is different from the second exemplary embodiment in that arithmetic device 2 includes auxiliary controller 23. Auxiliary controller 23 may comprise a hardwired circuit, a logic array, or the like, for example.

As with the second exemplary embodiment, the data processing device according to the third exemplary embodiment comprises controller 1 and arithmetic unit 2. Controller 1 comprises state manager 11, configuration number converter 12, configurational information storage 13, and configuration rewriter 15. Arithmetic device 2 comprises a plurality of arithmetic units 21 connected by interconnector 22 and auxiliary controller 23.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 designates the real number of the next configurational information. If next configurational information is not stored in configurational information storage 13, then configuration number converter 12 issues a rewriting request to configuration rewriter 15.

Configuration rewriter 15 writes configurational information in configurational information storage 13 when the data processing device is initially activated. When configuration number converter 12 issues a rewriting request, configuration rewriter 15 rewrites the configurational information that is not wanted at the present time, among the configurational information stored in configurational information storage 137 into configurational information designated upon the rewriting request. Configuration rewriter 15 also updates conversion information required for configuration number converter 12 to convert a logic is number into a real number. Configuration rewriter 15 may employ a known process such as Least Recently Used (LRU) process or the like, for example, for the selection of the unwanted configurational information.

Configuration rewriter 15 basically rewrites a single item of configurational information requested by a rewriting request. However, configuration rewriter 15 may also rewrite configurational information to be subsequently used as well as the requested configurational information.

Configurational information storage 13 holds object codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Arithmetic units 21 perform an arithmetic operation according to the configurational information designated by configurational information storage 13 in each of a plurality of operational states that are successively transited one from the other. Interconnector 22 changes connections between arithmetic units 21 based on the configurational information indicated by configurational information storage 13. Arithmetic units 21 and interconnector 22 issue an event signal depending on the result of the arithmetic operation to auxiliary controller 23.

Arithmetic units 21 and interconnector 22 according to the present exemplary embodiment have a function to stop their operation in response to a stop signal from auxiliary controller 23 and resume their operation in response to a resume signal therefrom. This function may be realized using a means for stopping an apparent operation, e.g., a means for stopping a clock or a means for stopping the updating of a storage means which arithmetic units 21 have. The former means is better from the standpoint of electric power reduction, whereas the latter means is better from the standpoint of easy packaging. If the data processing device performs its processing operation while exchanging data with a storage means such as an external memory or the like, then arithmetic units 21 input and output data through an external port. The operation to input data from the external port is also stopped and resumed according to a signal from auxiliary controller 23 (not shown in FIG. 3).

Auxiliary controller 23 is a circuit having the same function as controller 1, which is disposed in arithmetic device 2 and controls small-scale state transitions. When auxiliary controller 23 receives an event signal from arithmetic units 21 and interconnector 22, if a state to transit to next based on the event signal is within the control range of auxiliary controller 23, then auxiliary controller 23 designates configurational information corresponding to the next state for arithmetic units 21 and interconnector 22 to transit to. If a state to transit to next based on the event signal exceeds the control range of auxiliary controller 23, then auxiliary controller 23 requests a state transition under the control of controller 1. At this time, in order to prevent extra arithmetic operations from being carried out, auxiliary controller 23 sends a stop signal to arithmetic units 21 and interconnector 22 to stop their operation. When auxiliary controller 23 receives the configurational information designated by configurational information storage 13, auxiliary controller 23 designates the configurational information for arithmetic units 21 and interconnector 22. Thereafter, auxiliary controller 23 sends a resume signal to arithmetic units 21 and interconnector 22 to resume their operation.

The data processing device according to the present exemplary embodiment is capable of operating at a higher speed than the data processing device according to the background art because operational transitions are completed within arithmetic device 2 as long as small-scale state transitions controlled by auxiliary controller 23 are being carried out. If large-scale state transitions under the control of controller 1 are required, then unwanted operation of arithmetic device 2 is stopped for reduced power consumption.

As with the second exemplary embodiment, the data processing device according to the present exemplary embodiment is not subject to limitations on storage locations for configurational information and is not required to generate the same configurational information even if a plurality of object codes are to be stored. The above advantages manifest themselves particularly when a plurality of object codes are to be stored simultaneously.

In addition, the configuration rewriter makes it possible to use an object code comprising configurational information in excess of a memory capacity that is capable of holding it.

4th Exemplary Embodiment

FIG. 4 is a block diagram showing a configuration of a data processing device according to a fourth exemplary embodiment of the present invention.

The data processing device according to the fourth exemplary embodiment comprises two controllers 1 (11, 12 in FIG. 4) and two arithmetic devices 2 (21, 22 in FIG. 4) which share configuration rewriter 15. The data processing device is not limited to having two controllers 1 and two arithmetic devices 2, but may have any number of controllers 1 and arithmetic devices 2. The data processing device is not limited to having one shared configuration rewriter 15, but may have any number of configuration rewriters 2.

Configuration rewriter 15 of the data processing device according to the present exemplary embodiment has an arbitration function for handling either one of requests simultaneously issued by a plurality of configuration number converters. Specifically, when a rewriting request for configurational information is issued from another configuration number converter while a rewriting request from either one of the configuration number converters is being handled, the arbitration function of configuration rewriter 15 controls the set of controller 1 and arithmetic device 2 which has the other configuration number converter to suspend their operation until the processing of the prior rewriting request is completed.

Other structural and operational details of controllers 1 and arithmetic devices 2 are identical to those of the data processing device according to the second exemplary embodiment or the third exemplary embodiment, and will not be described in detail below.

If there are few rewriting requests for configurational information from the configuration number converters, then the installed area of the data processing device according to the present exemplary embodiment may be reduced as the arrangement of the present exemplary embodiment allows configuration rewriter 15 to be shared.

5th Exemplary Embodiment

FIG. 5 is a block diagram showing a configuration of a data processing device according to a fifth exemplary embodiment of the present invention.

The data processing device according to the fifth exemplary embodiment is different from the third exemplary embodiment in that a signal path is added from arithmetic device 2 to configuration is number converter 12.

As with the third exemplary embodiment, the data processing device according to the fifth exemplary embodiment comprises controller 1 and arithmetic unit 2 Controller 1 comprises state manager 11, configuration number converter 12, configurational information storage 13, and configuration rewriter 15. Arithmetic device 2 comprises a plurality of arithmetic units 21 connected by interconnector 22 and auxiliary controller 23.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 designates the real number of the next configurational information. If next configurational information is not stored in configurational information storage 13, then configuration number converter 12 issues a rewriting request to configuration rewriter 15.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 finishes the processing operation based on a request from arithmetic device 2 as there is no need to newly rewrite configurational information. If next configurational information is not stored in configurational information storage 13, then configuration number converter 12 issues a rewriting request to configuration rewriter 15.

Configuration rewriter 15 writes configurational information in configurational information storage 13 when the data processing device is initially activated. When configuration number converter 12 issues a rewriting request, configuration rewriter 15 rewrites the configurational information that is not wanted at the present time, among the configurational information stored in configurational information storage 13, into configurational information designated upon the rewriting request. Configuration rewriter 15 also updates conversion information required for configuration number converter 12 to convert a logic number into a real number Configuration rewriter 15 may employ a known process such as Least Recently Used (LRU) process or the like, for example, for the selection of the unwanted configurational information.

Configuration rewriter 15 basically rewrites a single item of configurational information requested by a rewriting request. However, configuration rewriter 15 may also rewrite configurational information to be subsequently used as well as the requested configurational information.

Configurational information storage 13 holds object codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Arithmetic units 21 perform an arithmetic operation according to the configurational information designated by configurational information storage 13 in each of a plurality of operational states that are successively transited one from the other. Interconnector 22 changes connections between arithmetic units 21 based on the configurational information indicated by configurational information storage 13. Arithmetic units 21 and interconnector 22 issue an event signal depending on the result of the arithmetic operation to auxiliary controller 23.

The arithmetic units according to the present exemplary embodiment issues a signal (preloading signal) for requesting the storage of necessary configurational information in configurational information storage 13, to configuration number converter 12. The signal is generated by an arithmetic operation based on analytic information included in an object code when the object code is generated.

Arithmetic units 21 and interconnector 22 according to the present exemplary embodiment have a function to stop their operation in response to a stop signal from auxiliary controller 23 and resume their operation in response to a resume signal therefrom. This function may be realized using a means for stopping an apparent operation, e.g., a means for stopping a clock or a means for stopping the updating of a storage means which arithmetic units 21 have. The former means is better from the standpoint of electric power reduction, whereas the latter means is better from the standpoint of easy packaging. If the data processing device performs its processing operation while exchanging data with a storage means such as an external memory or the like, then arithmetic units 21 input and output data through an external port. The operation to input data from the external port is also stopped and resumed according to a signal from auxiliary controller 23 (not shown in FIG. 5).

Auxiliary controller 23 is a circuit having the same function as controller 1, which is disposed in arithmetic device 2 and controls small-scale state transitions. When auxiliary controller 23 receives an event signal from arithmetic units 21 and interconnector 22, if a state to transit to next based on the event signal is within the control range of auxiliary controller 23, then auxiliary controller 23 designates configurational information corresponding to the next state for arithmetic units 21 and interconnector 22 to transit to. If a state to transit to next based on the event signal exceeds the control range of auxiliary controller 23, then auxiliary controller 23 requests a state transition under the control of controller 1. At this time, in order to prevent extra arithmetic operations from being carried out, auxiliary controller 23 sends a stop signal to arithmetic units 21 and interconnector 22 to stop their operation. When auxiliary controller 23 receives the configurational information designated by configurational information storage 13, auxiliary controller 23 designates the configurational information for arithmetic units 21 and interconnector 22. Thereafter, auxiliary controller 23 sends a resume signal to arithmetic units 21 and interconnector 22 to resume their operation.

With the data processing device according to the present exemplary embodiment, if an appropriate preloading request is issued from the arithmetic device, necessary configurational information can be written in configurational information storage 13 in advance. Therefore, at the stage of a state transition, the time to wait for the writing process to be performed by configuration rewriter 15 is reduced, and the real processing time is increased for better processing performance.

6th Exemplary Embodiment

FIG. 6 is a block diagram showing a configuration of a data processing device according to a sixth exemplary embodiment of the present invention.

The data processing device according to the sixth exemplary embodiment is different from the fifth exemplary embodiment in that it has rewriting determiner 16 which realizes a portion of the function of configuration rewriter 15.

As with the fifth exemplary embodiment, the data processing device according to the sixth exemplary embodiment comprises controller 1 and arithmetic unit 2. Controller 1 comprises state manager 11, configuration number converter 12, configurational information storage 13, configuration rewriter 15, and rewriting determiner 16. Arithmetic device 2 comprises a plurality of arithmetic units 21 connected by interconnector 22 and auxiliary controller 23.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 designates the real number of the next configurational information. If next configurational information is not stored in configurational information storage 13, then configuration number converter 12 issues a rewriting request to configuration rewriter 15.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 finishes the processing operation based on a request from arithmetic device 2 as there is no need to newly rewrite configurational information. If next configurational information is not stored in configurational information storage 13, then configuration number converter 12 issues a rewriting request to configuration rewriter 15.

Configuration rewriter 15 writes configurational information in configurational information storage 13 when the data processing device is initially activated. When configuration number converter 12 or rewriting determiner 16 issues a rewriting request, configuration rewriter 15 rewrites the configurational information that is not wanted at the present time, among the configurational information stored in configurational information storage 13, into configurational information designated upon the rewriting request. Configuration rewriter 15 also updates conversion information required for configuration number converter 12 to convert a logic number into a real number. Configuration rewriter 15 may employ a known process such as Least Recently Used (LRU) process or the like, for example, for the selection of the unwanted configurational information.

Configuration rewriter 15 rewrites a single item of configurational information requested by a rewriting request. If rewriting requests are simultaneously issued from configuration number converter 12 and rewriting determiner 16, configuration rewriter 15 prioritizes the request from configuration number converter 12. At this time, configuration rewriter 15 returns a signal indicative of whether the request is received or not to the source of the request source.

Rewriting determiner 16 determines the rewriting of configurational information of a state to transit to next, based on the states of configuration number converter 12, configurational information storage 13, and configuration rewriter 15 and the history of past state transitions, and requests configuration rewriter 15 to rewrite configurational information. If the request is denied, then rewriting determiner 16 takes into account other requests as the reason for the denial, and issues a new request to configuration rewriter 15. Rewriting determiner 16 thus performs the function to request the rewriting of requested configurational information and the rewriting of configurational information to be used subsequently to the present state, which function is performed by configuration rewriter 15 in the first through fifth exemplary embodiments.

Configurational information storage 13 holds object codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Arithmetic units 21 perform an arithmetic operation according to the configurational information designated by configurational information storage 13 in each of a plurality of operational states that are successively transited one from the other. Interconnector 22 changes connections between arithmetic units 21 based on the configurational information indicated by configurational information storage 13. Arithmetic units 21 and interconnector 22 issue an event signal depending on the result of the arithmetic operation to auxiliary controller 23. Arithmetic units 21 and interconnector 22 issue a configuration request signal (preloading signal) depending on the result of the arithmetic operation.

Arithmetic units 21 and interconnector 22 according to the present exemplary embodiment have a function to stop their operation in response to a stop signal from auxiliary controller 23 and resume their operation in response to a resume signal therefrom. This function may be realized using a means for stopping an apparent operation, e.g., a means for stopping a clock or a means for stopping the updating of a storage means which arithmetic units 21 have. The former means is better from the standpoint of electric power reduction, whereas the latter means is better from the standpoint of easy packaging. If the data processing device performs its processing operation while exchanging data with a storage means such as an external memory or the like, then arithmetic units 21 input and output data through an external port. The operation to input data from the external port is also stopped and resumed according to a signal from auxiliary controller 23 (not shown in FIG. 6).

Auxiliary controller 23 is a circuit having the same function as controller 1 which is disposed in arithmetic device 2 and controls small-scale state transitions. When auxiliary controller 23 receives an event signal from arithmetic units 21 and interconnector 22, if a state to transit to next based on the event signal is within the control range of auxiliary controller 23, then auxiliary controller 23 designates configurational information corresponding to the next state for arithmetic units 21 and interconnector 22 to transit to. If a state to transit to next based on the event signal exceeds the control range of auxiliary controller 23, then auxiliary controller 23 requests a state transition under the control of controller 1. At this times in order to prevent extra arithmetic operations from being carried out, auxiliary controller 23 sends a stop signal to arithmetic units 21 and interconnector 22 to stop their operation. When auxiliary controller 23 receives the configurational information designated by configurational information storage 13, auxiliary controller 23 designates the configurational information for arithmetic units 21 and interconnector 22. Thereafter, auxiliary controller 23 sends a resume signal to arithmetic units 21 and interconnector 22 to resume their operation.

With the data processing device according to the present exemplary embodiment, if an appropriate preloading request is issued from the arithmetic device, necessary configurational information can be written in configurational information storage 13 in advance. Therefore, at the stage of a state transition, the time to wait for the writing process to be performed by configuration rewriter 15 is reduced, and the real processing time is increased for better processing performance. Although a processing device such as an MPU or the like is required to determine configurational information that is requested to be rewritten, configuration rewriter 15 may perform only a process for writing requested configurational information into configurational information storage 13, and the installed area of the data processing device may be smaller than with the second and third exemplary embodiments. Accordingly, the function of the controller can be installed on one chip.

7th Exemplary Embodiment

FIG. 7 is a block diagram showing a configuration of a data processing device according to a seventh exemplary embodiment of the present invention.

The data processing device according to the seventh exemplary embodiment is different from the sixth exemplary embodiment in that it has a signal path for designating an internal state to start a processing operation from state manager 11 to auxiliary controller 23.

As with the sixth exemplary embodiment, the data processing device according to the seventh exemplary embodiment comprises controller 1 and arithmetic unit 2. Controller 1 comprises state manager 11, configuration number converter 12, configurational information storage 13, configuration rewriter 15, and rewriting determiner 16. Arithmetic device 2 comprises a plurality of arithmetic units 21 connected by interconnector 22 and auxiliary controller 23.

State manager 11 determines the logic number of configurational information to be used in a next operational state based on the present operational state included in configurational information and a candidate group (transitional destination candidate group) for a state to transit to next, and an event signal from arithmetic device 2, and indicates the logic number to configuration number converter 12. State manager 11 determines an internal state number to start a processing operation in a next operational state, which is to be performed by auxiliary controller 23, and indicates the determined internal state number to auxiliary controller 23.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 designates the real number of the next configurational information. If next configurational information is not stored in configurational information storage 13, then configuration number converter 12 issues a rewriting request to configuration rewriter 15.

Configuration number converter 12 converts the logic number of the configurational information indicated by state manager 11 into a real number of the corresponding configurational information stored in configurational information storage 13. If next configurational information is stored in configurational information storage 13 at this time, then configuration number converter 12 finishes the processing operation based on a request (preloading request) from arithmetic device 2 as there is no need to newly rewrite configurational information. If next configurational information is not stored in configurational information storage 13, then configuration number converter 12 issues a rewriting request to configuration rewriter 15.

Configuration rewriter 15 writes configurational information in configurational information storage 13 when the data processing device is initially activated. When configuration number converter 12 or rewriting determiner 16 issues a rewriting request, configuration rewriter 15 rewrites the configurational information that is not wanted at the present time, among the configurational information stored in configurational information storage 13, into configurational information designated upon the rewriting request. Configuration rewriter 15 also updates conversion information required for configuration number converter 12 to convert a logic number into a real number. Configuration rewriter 15 may employ a known process such as Least Recently Used (LRU) process or the like, for example, for the selection of the unwanted configurational information.

Configuration rewriter 15 rewrites a single item of configurational information requested by a rewriting request. If rewriting requests are simultaneously issued from configuration number converter 12 and rewriting determiner 16, configuration rewriter 15 prioritizes the request from configuration number converter 12. At this time, configuration rewriter 15 returns a signal indicative of whether the request is received or not to the source of the request source.

Rewriting determiner 16 determines the rewriting of configurational information of a state to transit to next, based on the states of configuration number converter 12, configurational information storage 13, and configuration rewriter 15, and requests configuration rewriter 15 to rewrite configurational information. If the request is denied, then rewriting determiner 16 takes into account other requests as the reason for the denial, and issues a new request to configuration rewriter 15. Rewriting determiner 16 thus performs the function to request the rewriting of requested configurational information and the rewriting of configurational information to be used subsequently to the present state, which function is performed by configuration rewriter 15 in the first through fifth exemplary embodiments.

Configurational information storage 13 holds object codes representing combinations of configurational information of an instruction group for arithmetic units 21 and interconnector 22 and a transitional destination candidate group in each operational state, and indicates the configurational information corresponding to the real number designated by configuration number converter 12 to arithmetic units 21, interconnector 22, a state manager 11.

Arithmetic units 21 perform an arithmetic operation according to the configurational information designated by configurational information storage 13 in each of a plurality of operational states that are successively transited one from the other. Interconnector 22 changes connections between arithmetic units 21 based on the configurational information indicated by configurational information storage 13. Arithmetic units 21 and interconnector 22 issue an event signal depending on the result of the arithmetic operation to auxiliary controller 23. Arithmetic units 21 and interconnector 22 issue a configuration request signal depending on the result of the arithmetic operation.

Arithmetic units 21 and interconnector 22 according to is the present exemplary embodiment have a function to stop their operation in response to a stop signal from auxiliary controller 23 and resume their operation in response to a resume signal therefrom. This function may be realized using a means for stopping an apparent operation, e.g., a means for stopping a clock or a means for stopping the updating of a storage means which arithmetic units 21 have. The former means is better from the standpoint of electric power reduction, whereas the latter means is better from the standpoint of easy packaging. If the data processing device performs its processing operation while exchanging data with a storage means such as an external memory or the like, then arithmetic units 21 input and output data through an external port. The operation to input data from the external port is also stopped and resumed according to a signal from auxiliary controller 23 (not shown in FIG. 7).

Auxiliary controller 23 is a circuit having the same function as controller 1, which is disposed in arithmetic device 2 and controls small-scale state transitions. When auxiliary controller 23 receives an event signal from arithmetic units 21 and interconnector 22, if a state to transit to next based on the event signal is within the control range of auxiliary controller 23, then auxiliary controller 23 designates configurational information corresponding to the next state for arithmetic units 21 and interconnector 22 to transit to. If a state to transit to next based on the event signal exceeds the control range of auxiliary controller 23, then auxiliary controller 23 requests a state transition under the control of controller 1. At this time, in order to prevent extra arithmetic operations from being carried out, auxiliary controller 23 sends a stop signal to arithmetic units 21 and interconnector 22 to stop their operation. When auxiliary controller 23 receives the configurational information designated by configurational information storage 13, auxiliary controller 23 designates the configurational information for arithmetic units 21 and interconnector 22. Thereafter, auxiliary controller 23 brings about the state of the designated internal state number to start the operation, and thereafter sends a resume signal to arithmetic units 21 and interconnector 22 to resume their operation.

With the data processing device according to the present exemplary embodiment, controller 1 can designate a state in which to start a processing operation with auxiliary controller 23 upon a state transition. As a result, the overall number of states can be reduced.

According to the first through sixth exemplary embodiments, the processing operation can be started from only a predetermined internal state. In other words, as many logic numbers as the number of branch destinations are required. Therefore, if an object code has state transitions with many branches, then there many items of configurational information, possibly tending to increase the rewriting count. The seventh exemplary embodiment can solve this problem. However, if hardware resources are to be reduced, the arrangements up to the sixth exemplary embodiment may be employed.

8th Exemplary Embodiment

FIG. 8 is a block diagram showing a configuration of a data processing device according to an eighth exemplary embodiment of the present invention.

The data processing device according to the eighth exemplary embodiment comprises two controllers 1 (11, 12 in FIG. 8) and two arithmetic devices 2 (21, 22 in FIG. 8) which share configuration rewriter 15. The data processing device is not limited to having two controllers 1 and two arithmetic devices 2, but may have any number of controllers 1 and arithmetic devices 2. The data processing device is not limited to having one shared configuration rewriter 15, but may have any number of configuration rewriters 2.

Rewriting determiner 16 of the data processing device according to the present exemplary embodiment monitors plural controllers 1 and requests each configuration rewriter to rewrite the configuration. When a rewriting request is issued to the configuration rewriter of either one of the sets, if the configuration rewriter to which the rewriting request is issued is rewriting the configuration, then it is not necessary to issue a new request following the rewriting request that has been issued. Rewriting determiner 16 generates and outputs a request for the other configuration rewriter.

Other structural and operational details of controllers 1 and arithmetic devices 2 are identical to those of the data processing device according to the sixth exemplary embodiment or the seventh exemplary embodiment, and will not be described in detail below.

The installed area of the data processing device according to the present exemplary embodiment may be reduced as plural controllers 1 and arithmetic devices 2 share rewriting determiner 16.

EXAMPLES

Examples of the present invention will be described with reference to the drawings.

1st Example

A first example is based on the application of the first exemplary embodiment of the present invention to the data processing devices disclosed in Patent documents 1 through 6.

FIG. 9 is a block diagram showing a configuration of a data processing device according to a first example of the present invention.

Arithmetic device 4 according to the present example comprises a plurality of processor elements (PE) each including a register file (RFU), an ALU, a data management unit (DMU), the processor elements being interconnected by interconnects and switches (SW). With this arrangement, each of the processor elements including the RFU, the FFU, ALU, and DMU serves as an arithmetic unit according to the first exemplary embodiment. Arithmetic device 4 is not limited to comprising processor elements, but may comprise a logic array, for example.

A controller according to the present example corresponds to state transition manager (STC) 3 of the DRP including state manager 31, configuration number converter 32, and configuration writer 34. The set of the processor elements and the state transition manager will be referred to as "tile".

According to the present example, a memory (hereinafter referred to as "configurational information memory") divided and disposed in each processor element and the state transition manager serves as the configurational information storage.

Operation of the data processing device according to the present example for performing a processing sequence according to two object codes A, B will be described below with reference to FIG. 10.

According to the present example, the instruction memory of the data processing device (DRP) can hold eight types of configurational information. When the data processing device receives a preparation request from an external source at the time it is activated, configuration writer 34 acquires corresponding configurational information. Object code A is written at real numbers "0" through "3" of the instruction memories of the processor elements, and object code B is written at real numbers "4" through "7" of the instruction memories of the processor elements. Then, configuration writer 34 updates the state transition table of state manager 31 of state transition manager (controller) 3 and the conversion table, used as the conversion information, of configuration number converter 32, as shown in FIG. 11, and finishes its writing process.

When configuration number converter 32 receives a processing execution request from an external source, it acquires the configurational information of a real number designated as an initial state, and designates the configurational information of the initial state for the processor element group to enable the processor element group to start their processing sequence. After the above operation, the data processing device shifts to a normal operation.

When configuration writer 34 receives an execution request for object code A from an external source, it instructs configuration number converter 32 to select the conversion table of object code A. At this time, it is assumed that the start state is logic number "0" representing the initial state of object code A.

Using the presently selected conversion table of object code A, configuration number converter 32 converts logic number "0" into real number "0", and indicates real number "0" was the pointer of the instruction memory and the real number of the present state of state manager 31 to arithmetic device 4.

The configurational information of the present state is indicated to each of the processor elements of arithmetic device 4, determining an operation of each processor element and connections of the switches (interconnector). As a result, each processor element carries out a predetermined arithmetic operation.

When the processor element group indicates the result of the arithmetic operation as an event signal to state transition manager 3, state transition manager 3 transits to a next state by referring to a state transition table corresponding to the event signal. Since state transition manager 3 can determine the present real number and the logic number of the next state corresponding to the event signal, state transition manager 3 indicates the logic number to configuration number converter 32.

Configuration number converter 32 converts the logic number into a real number, using the presently selected conversion table of object code A, and indicates the real number as the pointer of the instruction memory and the real number of the present state of state manager 31 to arithmetic device 4.

The above processing sequence is repeatedly performed until the processing of object code A is finished.

Then, when configuration writer 34 receives an execution is request for object code B from an external source, it instructs configuration number converter 32 to select the conversion table of object code B. At this time, it is assumed that the start state is logic number "0" representing the initial state of object code B.

Using the presently selected conversion table of object code B, configuration number converter 32 converts logic number "0" into real number "4", and indicates real number "4" as the pointer of the instruction memory and the real number of the present state of state manager 31 to arithmetic device 4.

The subsequent operation is the same as the processing of object code A.

According to the present example, the logic numbers of the configurational information designated by object codes A, B are "0" through "3". Irrespectively of whether object codes A, B are simultaneously stored or either one of them is executed in response to an external request, configuration number converter 32 selects a real number of required configurational information. Therefore, object codes do not need to be recombined, and are free of layout limitations. Objects codes can be installed according to a free layout without the need for recombining themselves. There is no need for taking into account mutual interference between object codes.

2nd Example

A second example is based on the application of the third exemplary embodiment of the present invention to the data processing devices disclosed in Patent documents 1 through 6.

FIG. 12 is a block diagram showing a configuration of a data processing device according to a second example of the present invention.

Arithmetic device 4 according to the present example comprises a plurality of processor elements (PE) each including a register file (RFU), an ALU, a data management unit (DMU), the processor elements being interconnected by interconnects and switches (SW). With this arrangement, each of the processor elements including the RFU, the FFU, ALU, and DMU serves as an arithmetic unit according to the third exemplary embodiment. Arithmetic device 4 is not limited to comprising processor elements, but may comprise a logic array, for example.

Controller 3 according to the present example corresponds to the state transition manager (STC) of the DRP including state manager 31, configuration number converter 32, and configuration writer 35.

Auxiliary controller (MSTC) 42 comprises state manger 43 and a configuration number converter (not shown), as with controller 3. However, auxiliary controller 42 can hold fewer states than controller (state transition manager) 3. If auxiliary controller 42 controls state transitions using only the real numbers of configurational information, then auxiliary controller 42 requires no configuration number converter. According to the present example, the set of a group of processor elements 4, auxiliary controller 42, and controller 3 will be referred to as "tile".

According to the present example, a memory (hereinafter referred to as "configurational information memory") divided and disposed in each processor element 41 and auxiliary controller 42 serves as the configurational information storage.

According to the present example, the data processing device has external memory (storage means) 6 storing object codes, and configuration writer 35 can acquire object codes from external memory 6.

When the data processing device is activated, configuration writer 35 acquires the configurational information of an object code that is preset according to a preparation request from an external source, and stores the configurational information in the configurational information memory. Then, configuration writer 35 updates the state transition tables of controller 3 and auxiliary controller 42 and the conversion table, used as the conversion information, of configuration number converter 32, and finishes its writing process. In response to the end of the writing process, configuration number converter 32 acquires the real number of each configuration information of the object code in the initial state by referring to the conversion table, and indicates the real number to auxiliary controller 42.

Based on the acquired real number, auxiliary controller 42 designates the configurational information of the initial state for the group of processor elements 41. Auxiliary controller 42 then stops issuing a write enable (WE) canceling signal, and enables the group of processor elements 41 to start their processing sequence.

After the above operation, the data processing device shifts to a normal operation.

The normal operation of the data processing device according to the present example will be described below with respect to a processing sequence according to an object code for achieving state transitions shown in FIG. 13.

According to the present example, the instruction memory of the data processing device (DRP) can hold eight types of configurational information. As shown in FIG. 14, real numbers "0" through "5" of the instruction memory of each processor element 41 are used by other object codes, and the configurational information of logic numbers "0", "1" is stored in real numbers "6", "7". Each configurational information has a plurality of states to transit to under the control of auxiliary controller 42. If the number (hereinafter referred to as "internal state number") of the state controlled by auxiliary controller 42, which is included in the configurational information of logic number "x", is referred to as "y", then the state will be represented by "x-y".

Auxiliary controller 42 stores a state transition diagram of logic numbers "0", "1" shown in FIG. 15, and state manager 31 of controller 3 stores a state transition diagram between the logic numbers shown in FIG. 16.

A state transition diagram of logic numbers "2", "3" is stored in an external memory, and the processing sequence starts to be executed from internal state number "2" (state 0-2) included in the configurational information of logic number "0". At this time, the configurational information of the present state is indicated to each processor element 41 of arithmetic device 4, determining an operation of each processor element 41 and connections of the switches. As a result, each processor element 41 carries out a predetermined arithmetic operation.

When the result of the arithmetic operation is indicated as an event signal to auxiliary controller 42, auxiliary controller 42 controls the transition to a next state based on the state transition diagram corresponding to the event signal. Since the state transition is a small-scale state transition (a transition from state 0-2 to state 0-3) controllable by auxiliary controller 42, configuration number converter 32 designates internal state number "3" for the group of processor elements 41.

If event signal A for a transition from state 0-3 to state 1-1 is issued based on the result of the arithmetic operation, then auxiliary controller 42 only recognizes a transition from state 0-3 to another logic number. Therefore, auxiliary controller 42 issues a WE canceling signal to stop the operation of the group of processor elements 41. Based on the signal, the registers of processor elements 41 do not accept the updating of the data held thereby, and stop the inputting of data from the internal port.

At the same time that auxiliary controller 42 issues the WE canceling signal, it sends an event signal to controller 3. When state manager 31 receives the event signal from auxiliary controller 42, state manager 31 determines logic number "1" of a state to transit to next based on present real number "6" and event signal A according to the conversion table generated based on the state transition diagram, and sends logic number "1" to configuration number converter 32.

Configuration number converter 32 converts the logic number into a real number using the conversion table. Since the configurational information of the next state is held by the configurational information memory, the conversion is successful, and configuration number converter 32 transmits obtained real number "7" to auxiliary controller 42 and state manger 31.

When auxiliary controller 42 receives real number "7" of the configurational information, it designates the configurational information of a next state for the group of processor elements 41. Auxiliary controller 42 stops issuing the WE canceling signal, and enables the group of processor elements 41 to resume their processing sequence.

If event signal A for a transition from state 1-4 to state 2-1 is issued based on the result of the arithmetic operation of each processor element 41, then since the transition is a large-scale state transition that cannot be controlled by auxiliary controller 42, auxiliary controller 42 issues a WE canceling signal for stopping the operation of the group of processor elements 41. Based on the signal, the registers of processor elements 41 do not accept the updating of the data held thereby, and stop the inputting of data from the internal port.

At the same time that auxiliary controller 42 issues the WE canceling signal, it sends an event signal to state manager 31. When state manager 31 receives the event signal from auxiliary controller 42, state manager 31 determines logic number "2" of a next state based on present real number "7" and event signal A according to the conversion table generated based on the state transition diagram, and sends logic number "2" to configuration number converter 32.

Configuration number converter 32 converts logic number "2" into a real number using the conversion table. Since the configurational information of the next state is not held by the configurational information memory, the conversion table does not have a corresponding real number, and the conversion into a real number fails. Configuration number converter 32 requests configuration rewriter 35 to rewrite the configurational information of real number "2".

Configuration rewriter 35 includes a configuration conversion table having all the configurational information included in each object code, selects corresponding configurational information based on the configuration conversion table, and determines a configurational information memory to be rewritten. Here, real numbers "0" through "5" are to be rewritten except for the area where logic number "0" or "1" is written, which are not likely to be used again immediately.

Configuration rewriter 35 writes the configurational information of requested logic number "2" into the configurational information memory of real number "0", thereby updating the state transition diagram of state manager 43 of auxiliary controller 42. Configuration rewriter 35 then updates the conversion table of configuration number converter 32, and finishes the rewriting process. The updated state transition diagram held by state manager 43 of auxiliary controller 42 is shown in FIG. 17, and the rewritten conversion table is shown in FIG. 18.

In response to the end of the rewriting process, configuration number converter 32 refers to the conversion table again, acquires real number "0" of a next state, and indicates real number "0" to auxiliary controller 42 and state manager 31.

Auxiliary controller 42 designates the configurational information corresponding to real number "0" of the next state for the group of processor elements 41. Auxiliary controller 42 stops issuing the WE canceling signal, and enables the group of processor elements 41 to resume their processing sequence.

The above processing operation is repeated to perform the arithmetic process on the data to be processed.

Since the transitional destination next to logic number "2" is only logic number "3", the logic number required in the subsequent state can clearly be determined. In such a case, if the configurational information of logic number "3" is written into the configurational information memory while the group of processor elements 41 is processing logic number "2", then when event signal A for transiting from state 2-4 to state 3-1 is transmitted, since the corresponding configurational information has already been written in the configurational information memory, configuration number converter 32 can immediately determine the real number of the transitional destination, and indicate the real number to auxiliary controller 42.

If it is known in certain state A that the next transitional destination is only other state B, then since the conversion from a logic number into a real number does not fail providing the configurational information of state B is also written at the time the configurational information of state A is written, the amount of processing is reduced and the processing sequence is higher in speed. If the storage capacity of the configurational information memory is sufficiently large, all the configurational information of a next transitional candidate may be written in the configurational information memory.

In the example shown in FIG. 13, transitions in which the logic number changes from state 0-3 include state 1-1 and state 2-1. Transitional destinations for these states can be distinguished from each other by issuing different event signals from arithmetic device 4.

In the above description, the state transits necessarily to internal state number "1" in state transitions in which the logic number changes (state transitions under the control of the state transition manager). If the state transits necessarily to internal state number "1" when the logic number changes, as described above, state manager 31 does not need to know the internal state number for each logic number. It is possible to transit to an arbitrary internal state number when the logic number changes.

According to the present example, the external storage means stores each configurational information of an object code, and the contents of the configurational information memory is rewritten by the configuration rewriter when necessary. The data processing device is thus capable of performing its processing sequence according to the configurational information in excess of the storage capacity of the configurational information memory.

Accordingly, a small-scale data processing device can execute large-scale object codes, and can have a chip cost reduced because the chip area thereof is smaller than heretofore.

3rd Example

A third example is based on the application of the seventh exemplary embodiment of the present invention to the data processing devices disclosed in Patent documents 1 through 6.

FIG. 19 is a block diagram showing a configuration of a data processing device according to a third example of the present invention.

Arithmetic device 4 according to the present example comprises a plurality of processor elements (PE) each including a register file (RFU), an ALU, a data management unit (DMU), the processor elements being interconnected by interconnects and switches (SW). With this arrangement, each of the processor elements including the RFU, the FFU, ALU, and DMU serves as an arithmetic unit according to the seventh exemplary embodiment. Arithmetic device 4 is not limited to comprising processor elements, but may comprise a logic array, for example.

Controller 3 according to the present example corresponds to the state transition manager (STC) of the DRP including state manager 31, configuration number converter 32, and configuration writer 35.

The data processing device according to the present example includes rewriting determiner 36 for referring to the states of configuration number converter 32 and configuration rewriter 35 to predict configurational information required by state transitions subsequent to the present state, and determining the rewriting of configurational information in the configurational information storage.

Auxiliary controller (MSTC) 42 comprises state manger 43 and a configuration number converter (not shown), as with controller 3. However, auxiliary controller 42 can hold fewer states than controller (state transition manager) 3. If auxiliary controller 42 controls state transitions using only the real numbers of configurational information, then auxiliary controller 42 requires no configuration number converter. According to the present example, the set of a group of processor elements 41, auxiliary controller 42, and controller 3 will be referred to as "tile".

According to the present example, a memory (hereinafter referred to as "configurational information memory") divided and disposed in each processor element 41 and auxiliary controller 42 serves as the configurational information storage. According to the present example, the data processing device has external memory (storage means) 6 storing object codes, and configuration writer 35 can acquire object codes from external memory 6.

When the data processing device is activated, configuration writer 35 acquires the configurational information of an object code that is preset according to a preparation request from an external source, and stores the configurational information in the configurational information memory. Then, configuration writer 35 updates the state transition tables of controller 3 and auxiliary controller 42 and the conversion table, used as the conversion information, of configuration number converter 32, and finishes its writing process. In response to the end of the writing process, configuration number converter 32 acquires the real number of each configuration information of the object code in the initial state by referring to the conversion table, and indicates the real number to auxiliary controller 42. Configuration rewriter 35 may not necessarily start its operation in response to the preparation request from the external source, but may execute a predetermined operational sequence at the same time that the data processing device is activated.

Based on the acquired real number, auxiliary controller 42 designates the configurational information of the initial state for the group of processor elements 41. Auxiliary controller 42 then stops issuing a write enable (WE) canceling signal, and enables the group of processor elements 41 to start their processing sequence.

After the above operation, the data processing device shifts to a normal operation.

The normal operation of the data processing device according to the present example will be described below with respect to a processing sequence according to an object code for achieving state transitions shown in FIGS. 20 and 21.

The state transitions shown in FIGS. 20 and 21 are based on the assumption that two types of packets arrive and a processing sequence is performed depending on the types of the packets. Logic number "0" represents the waiting for an input, and logic number "3" represents an operation common to the two types, FIG. 20 shows a state transition diagram handled by state manager 31, and FIG. 21 shows an internal state of a portion of the state transition shown in FIG. 20.

According to the present example, the instruction memory of the data processing device (DRP) can hold eight types of configurational information, and holds the configurational information of logic number 0 at real number 0 as shown in FIG. 22. Each configurational information has a plurality of states to transit to under the control of auxiliary controller 42. If the number (hereinafter referred to as "internal state number") of the state controlled by auxiliary controller 42, which is included in the configurational information of logic number "x", is referred to as "y", then the state will be represented by "x-y".

Auxiliary controller 42 stores the state transition diagram of logic number "0" shown in the uppermost area of FIG. 21, and state manager 31 of state transition manager 3 stores the state transition diagram between the logic numbers shown in FIG. 20.

It is assumed that the external memory stores the state transition diagrams of all the logic numbers and the processing sequence starts to be executed from internal state number "1" (state 0-1) included in the configurational information of logic number "0".

At this time, the configurational information of the present state is indicated to each processor element 41 of arithmetic device 4, determining an operation of each processor element 41 and connections of the switches. As a result, each processor element 41 carries out a predetermined arithmetic operation.

When the result of the arithmetic operation is indicated as an event signal to auxiliary controller 42, auxiliary controller 42 controls the transition to a next state based on the state transition diagram corresponding to the event signal. Since the state transition is a small-scale state transition (a transition from state 0-1 to state 0-2) controllable by auxiliary controller 42, configuration number converter 32 designates internal state number "2" for the group of processor elements 41.

At a next clock, an event signal is similarly indicated to auxiliary controller 42, causing a state transition from state 0-2 to state 0-3.

If event signal A for a transition from state 0-3 to state 1-1 is issued based on the result of the arithmetic operation, then since the state transition is a large-scale state transition that cannot be controlled by auxiliary controller 42, auxiliary controller 42 issues a WE canceling signal to stop the operation of the group of processor elements 41. Based on the signal, the registers of processor elements 41 do not accept the updating of the data held thereby, and stop the inputting of data from the internal port.

At the same time that auxiliary controller 42 issues the WE canceling signal, it sends an event signal to state manager 31. When state manager 31 receives the event signal from auxiliary controller 42, state manager 31 determines logic number "1", of a next state based on present real number "0" and event signal A according to the conversion table generated based on the state transition diagram, and sends logic number "1" to configuration number converter 32. State manager 31 determines internal state number "1" of the next state and indicates internal state number "1" to auxiliary controller 42.

Configuration number converter 32 converts logic number "1" into a real number using the conversion table. Since the configurational information of the next state is not held by the configurational information memory, the conversion table does not have a corresponding real number, and the conversion into a real number fails. Configuration number converter 32 requests configuration rewriter 35 to rewrite the configurational information of real number "1".

Configuration rewriter 35 includes a configuration conversion table having all the configurational information included in each object code, selects corresponding configurational information based on the configuration conversion table, and determines a configurational information memory to be rewritten. Here, real numbers "1" through "7" are to be rewritten except for the area where logic number "0" is written.

Configuration rewriter 35 updates the conversion table of configuration number converter 32, writes the configurational information of requested logic number "1" into the configurational information memory of real number "1", thereby updating the state transition diagram of state manager 43 of auxiliary controller 42. Configuration rewriter 35 then updates a writing completion flag of the conversion table of configuration number converter 32, and finishes the rewriting process.

In response to the end of the rewriting process, configuration number converter 32 refers to the conversion table again, acquires real number "1" of a next state, and indicates real number "0" to auxiliary controller 42 and state manager 31.

Auxiliary controller 42 designates the configurational information corresponding to real number "1" of the next state and its internal number "1" for the group of processor elements 41. Auxiliary controller 42 stops issuing the WE canceling signal, and enables the group of processor elements 41 to resume their processing sequence.

Logic number "1" transits only to logic number "2" as is apparent from the state transition diagram shown in FIG. 20. When rewriting determiner 36 receives information representing an instruction to shift to logic number "1", rewriting determiner 36 analyzes the state transition diagram, and requests configuration rewriter 35 for the configurational information of logic number "2". In the present example, while the group of processor elements 41 is operating with logic number "1", configuration rewriter 35 starts to write the configuration of logic number "2". The conversion table at the time configuration rewriter 35 starts to write the configurational information is shown in FIG. 23($a$). It is assumed that the state transition of logic number "1" is long and configuration rewriter 35 ends writing the configurational information of logic number "2" while logic number "1" is being processed. When the end of the writing of the configurational information is indicated to rewriting determiner 36, since logic number "2" transits only to logic number "3", rewriting determiner 36 requests configuration rewriter 35 for the configurational information of logic number "3".

If the processing of logic number "1" is finished and event signal A for transiting from state 1-4 to state 2-1 is issued, then auxiliary controller 42 only recognizes a transition from state 1-4 to another logic number. Therefore, auxiliary controller 42 issues a WE canceling signal to stop the operation of the group of processor elements 41. Based on the signal, the registers of processor elements 41 do not accept the updating of the data held thereby, and stop the inputting of data from the internal port.

At the same time that auxiliary controller 42 issues the WE canceling signal, it sends an event signal to state transition manager 3. When state manager 31 receives the event signal from auxiliary controller 42, state manager 31 determines logic number "2" of a state to transit to next based on present real number "1" and event signal A according to the conversion table generated based on the state transition diagram, and sends logic number "1" to configuration number converter 32. State manager 31 determines internal state number "1" of logic number "2" to transit to next and indicates internal state number "1" to auxiliary controller 42.

Configuration number converter 32 converts the logic number into a real number using the conversion table. Since the writing of the configurational information of logic number "2" to transit to next is finished and the writing completion flag is set, the conversion into the real number is successful. Configuration number converter 32 transmits obtained real number "2" to auxiliary controller 42 and state manager 31.

When auxiliary controller 42 receives real number "2" of the configurational information and internal state number "1", it designates the configurational information of a next state for the group of processor elements 41. Auxiliary controller 42 stops issuing the WE canceling signal and enables the group of processor elements 41 to resume their processing sequence.

As shown in FIG. 20, there are two transitional destinations from logic number "3", i.e., logic number "4" and logic number "11". Transitional destinations may be set such that a transition from logic number "2" will transit only to logic number "4" and a transition from logic number "10" will transit only to logic number "11". Such transitional destinations cannot be designated only by state transition diagrams, but can be set at the stage where object codes are combined. It is assumed that transitional destinations are designated at the stage where object codes are combined. Specifically, object codes may be combined such that when a transition has been made to logic number "3", processor elements 41 perform a process of outputting a preloading request for a next transitional destination depending on the process so far to configuration number converter 32. Such a preloading request may be output not when a transition has reached logic number "3", but when a transition has reached logic number "2" or "10" or a preceding logic number. If it takes time for the internal state of logic number "3" to transit, then it is sufficient to output a preloading request when a transition has reached logic number "3". If the time required for a transition to transit from logic number "3" to another logic number is short, then a preloading request may be output before a transition reaches logic number "3".

When logic number "2" transits to logic number "3", and a state transition starts at logic number "3", a preloading request for logic number "4" from processor elements 41 is output to configuration number converter 32.

Configuration number converter 32 converts logic number "4" into a real number using the conversion table. Since the configurational information of the next state is not held by the configurational information memory, the conversion table does not have a corresponding real number, and the conversion into a real number fails. Configuration number converter 32 requests configuration rewriter 35 to rewrite the configurational information of real number "4".

Configuration rewriter 35 includes a configuration conversion table having all the configurational information included in each object code, selects corresponding configurational information based on the configuration conversion table, and determines a configurational information memory to be rewritten. Here, real numbers "4" through "7" are to be rewritten except for the area where no configurational information is written.

Configuration rewriter 35 updates the conversion table of configuration number converter 32, writes the configurational information of logic number "4" that is requested to be rewritten into the configurational information memory of real number "4", thereby updating the state transition diagram of state manager 43 of auxiliary controller 42. Configuration rewriter 35 then updates a writing completion flag of the conversion table of configuration number converter 32, and finishes the rewriting process. The rewritten conversion table is shown in FIG. 23(*b*).

In response to the end of the rewriting process, configuration number converter 32 completes the process for the preloading request. Since this process is not a state transition, no configuration is indicated.

If the processing of logic number (4) is not time-consuming and event number A for transiting from state 3-4 to state 4-1 is issued while the preloading request is being rewritten, then auxiliary controller 42 only recognizes a transition from state 3-4 to another logic number. Therefore, auxiliary controller 42 issues a WE canceling signal to stop the operation of the group of processor elements 41. Based on the signal, the registers of processor elements 41 do not accept the updating of the data held thereby, and stop the inputting of data from the internal port.

At the same time that auxiliary controller 42 issues the WE canceling signal, it sends an event signal to state transition manager 3. When state manager 31 of the state transition manager receives the event signal from auxiliary controller 42, state manager 31 determines logic number "4" of a state to transit to next based on present real number "1" and event signal A according to the conversion table generated based on the state transition diagram, and sends logic number "4" to configuration number converter 32. State manager 31 determines internal state number "1" of the next state and indicates internal state number "1" to auxiliary controller 42.

Configuration number converter 32 converts the logic number into a real number using the conversion table. Since the configurational information of the next state is being written into the configurational information memory by the preloading request, configuration number converter 32 succeeds in converting the logic number. Configuration number converter 32 sends real number "4" obtained after having waited for a writing completion flag to auxiliary controller 42 and state manager 31.

When auxiliary controller 42 receives real number "2" of the configurational information and internal number "1", it designates the configurational information of a next state for the group of processor elements 41. Auxiliary controller 42 stops issuing the WE canceling signal, and enables the group of processor elements 41 to resume their processing sequence.

It is assumed that rewriting determiner 36 request the configurational information of logic number "8". The conversion table at this time is shown in FIG. 23(*c*). When configuration rewriter 35 writes configurational information in response to the request of the configurational information of logic number "8" from rewriting determiner 36, eight items of configurational information have already been written in the configurational information memory. In order to write the configurational information of logic number "8", some configurational information has to be erased from the configurational information memory. A logic number to be erased may be determined by various processes. In the present example, the configurational information of a logic number which represents a transitional destination remotest from the logic number that is being currently executed is erased. If the logic number that is being currently executed is "5", then configuration rewriter 35 erases the configurational information of logic number "4" written at real number "4", and writes the configurational information of logic number "8" instead. The conversion table at the time the configurational information starts to be written is shown in FIG. 23(*d*).

It is further assumed that as the processing sequence goes on, the process on the packet that has initially arrived (first packet) is finished and the processing sequence returns to logic number "0". The conversion table at this time is shown in FIG. 23(*e*). If a packet that has arrived next (second packet) is the same as the packet that has initially arrived, and a transition is made to logic number "1", then since there has already been configurational information up to logic number "3", rewriting determiner 36 issues a request for the configurational information of logic number "4" to configuration rewriter 35.

Configuration rewriter 35 erases the configurational information of logic number "0" which represents a transitional destination remotest from logic number "1", and writes the configurational information of logic number "4". In this case, the configurational information of logic number "4" is written at a real number which is different from the real number which has initially been written. According to the present invention, the problem occurring due to the different real numbers is solved by a process of converting a logic number into a real number. The conversion table at the time a transition has been made to logic number "2" is shown in FIG. 23(f). When a transition has been made to logic number "2", configuration rewriter 35 erases the configurational information of logic number "1", and writes the configurational information of logic number "0" instead.

It is further assumed that the process on the second packet is finished and the processing sequence returns to logic number "0". The conversion table at this time is shown in FIG. 23(g). A packet (third packet) that has arrived next to the second packet is of a type different from the first and second packets. When event signal B for transiting from state 0-3 to state 9-1 is issued as the result of the arithmetic so operation of each processor element 41, since the transition is a large-scale state transition that cannot be controlled by auxiliary controller 42, auxiliary controller 42 issues a WE canceling signal to stop the operation of the group of processor elements 41. Based on the signal, the registers of processor elements 41 do not accept the updating of the contents thereof, and stop the inputting of data from the internal port.

At the same time that auxiliary controller 42 issues the WE canceling signal, it sends an event signal to state manager 31. When state manager 31 receives the event signal from auxiliary controller 42, state manager 31 determines logic number "9" of a next state based on present real number "0" and event signal B according to the conversion table generated based on the state transition diagram, and sends logic number "9" to configuration number converter 32. State manager 31 determines internal state number "1" of the next state and indicates internal state number "1" to auxiliary controller 42.

Configuration number converter 32 converts logic number "9" into a real number using the conversion table. Since the configurational information of the next state is not held by the configurational information memory, the conversion table does not have a corresponding real number, and the conversion into a real number fails. Configuration number converter 32 requests configuration rewriter 35 to rewrite the configurational information of real number "9".

Configuration rewriter 35 includes a configuration conversion table having all the configurational information included in each object code, selects corresponding configurational information based on the configuration conversion table, and determines a configurational information memory to be rewritten. Here, real numbers "1" through "7" are to be rewritten except for the area where logic number "0" is written. Configuration rewriter 35 determines real number "2" where logic number "2" remotest from logic number "9" is rewritten, as a real number to be rewritten.

Configuration rewriter 35 updates the conversion table of configuration number converter 32, writes the configurational information of requested logic number "9" into the configurational information memory of real number "2", thereby updating the state transition diagram of the state manager of auxiliary controller 42. Configuration rewriter 35 then updates a writing completion flag of the conversion table of configuration number converter 32, and finishes the rewriting process.

In response to the end of the rewriting process, configuration number converter 32 refers to the conversion table again, acquires real number "2" of a next state, and indicates real number "2" to auxiliary controller 42 and state manager 31.

Auxiliary controller 42 designates the configurational information corresponding to real number "2" of the next state and its internal number "1" for the group of processor elements 41. Auxiliary controller 42 stops issuing the WE canceling signal, and enables the group of processor elements 41 to resume their processing sequence. The conversion table at this time is shown in FIG. 23(h).

At the time rewriting determiner 36 recognizes that logic number "9" is a transitional destination, rewriting determiner 36 determines logic number "10" required next, and issues a request to configuration writer 35. When the writing of the configurational information of logic number "9" is finished, configuration writer 35 starts writing the configurational information of logic number "10".

Then, when event signal B for transiting from state 9-1 to state 10-2 is issued as the result of the arithmetic operation of each processor element 41, since the transition is a large-scale state transition that cannot be controlled by auxiliary controller 42, auxiliary controller 42 issues a WE canceling signal to stop the operation of the group of processor elements 41. Based on the signal, the registers of processor elements 41 do not accept the updating of the contents thereof, and stop the inputting of data from the internal port.

At the same time that auxiliary controller 42 issues the WE canceling signal, it sends an event signal to state manager 31. When state manager 31 receives the event signal from auxiliary controller 42, state manager 31 determines logic number "10" of a next state based on present real number "2" and event signal B according to the conversion table generated based on the state transition diagram, and sends logic number "10" to configuration number converter 32. State manager 31 determines internal state number "2", of the next state and indicates internal state number "2" to auxiliary controller 42.

Configuration number converter 32 converts the logic number into a real number using the conversion table. Since the configurational information of the next state is being written into the configurational information memory by the preloading request, configuration number converter 32 succeeds in converting the logic number. Configuration number converter 32 sends real number "0" obtained after having waited for a writing completion flag to auxiliary controller 42 and state manager 31.

When auxiliary controller 42 receives real number "0" of the configurational information and internal number "2", it designates the configurational information of a next state for the group of processor elements 41. Auxiliary controller 42 stops issuing the WE canceling signal, and enables the group of processor elements 41 to resume their processing sequence. The conversion table at this time is shown in FIG. 23(i).

If the sequence in which two types of packets arrive has some regularity, then rewriting determiner 36 may predict a transitional destination from logic number "0" using the history of the packets, and may request for the configurational information of logic number "1" or logic number "9". If the sequence in which two types of packets arrive has no regularity and both packets arrive substantially to the same extent, rewriting determiner 36 may request for the configurational information of logic number "1" and logic number "9". According to such a processing sequence, since there is no need to wait for the finish of the rewriting of the configurational information upon a transition from logic is number "0", the waiting time in the processing sequence is reduced for better processing performance.

The above processing operation is repeated to perform the arithmetic process on the data to be processed.

In the state transition shown in FIG. 21, transitions in which the logic number changes from state 0-3 include state 1-1 and state 9-1. Transitional destinations for these states can be distinguished from each other by issuing different event signals from arithmetic device 4.

Both a transition from state 9-1 to state 10-2 and a transition from state 9-3 to state 10-1, for example, represent a transition from logic number "9" to logic number "10". In this case, the internal numbers of transitional destinations can also be distinguished from each other by issuing different event signals from arithmetic device 4, and a transition to an arbitrary internal number can be made.

In the above description, the state does not necessarily transit to internal state number "1" in state transitions in which the logic number changes (state transitions under the control of the state transition manager). If the state is to transit necessarily to internal state number "1" when the logic number changes, state manager 31 may divide the internal state of logic number "10" into two states. In such a case, state 10-1 should desirably be included in logic number "9". If such an inclusion is not possible, then the number of items of configurational information is increased.

According to the present example, the external storage means stores each configurational information of an object code, and the contents of the configurational information memory is rewritten by the configuration rewriter when necessary. The data processing device is thus capable of performing its processing sequence according to the configurational information in excess of the storage capacity of the configurational information memory.

Accordingly, a small-scale data processing device can execute large-scale object codes, and can have a chip cost reduced because the chip area thereof is smaller than heretofore.

If the necessary configurational information is rewritten in advance, then the waiting time in the processing sequence is reduced for better processing performance.

The invention claimed is:

1. A data processing device including a plurality of arithmetic units and an interconnector for changing connections between the arithmetic units, for reconfiguring a circuit for performing various processing operations according to an object code comprising at least one item of configurational information which includes arithmetic instructions for the arithmetic units and information representative of connections between the arithmetic units, said data processing device comprising:
   a state manager for determining a logic number of the configurational information to be used in a next state, the logic number representing information on a mutual relationship between items of the configurational information included in the object code, based on a present operational state, a group of candidates for a state to transit to next, and an event signal issued from the arithmetic units;
   a configuration number converter for outputting a real number corresponding to the logic number determined by said state manager, said configuration number converter having conversion information for converting said logic number into a real number representing a location where the corresponding configurational information is actually stored; and
   a configurational information storage for storing said configurational information and indicating configurational information corresponding to the real number output from said configuration number converter, to said arithmetic units and said interconnector.

2. The data processing device according to claim 1, further comprising an auxiliary controller inserted between said arithmetic units, said interconnector, and said state manager, for controlling transitions smaller in scale than transitions which can be controlled by said state manager.

3. The data processing device according to claim 1, further comprising a rewriting determiner for writing in said configurational information storage configurational information corresponding to a real number if there is not such a real number corresponding to the logic number determined by said state manager, and predicting configurational information required in a state subsequent to a state to transit to next.

4. The data processing device according to claim 1, further comprising a configuration rewriter for writing in said configurational information storage configurational information corresponding to a real number if there is not such a real number corresponding to the logic number determined by said state manager, and rewriting conversion information, held by said configuration number converter, for converting the logic number into a corresponding real number.

5. The data processing device according to claim 4, further comprising storage means for storing said configurational information, said storage means being independent of the data processing device;
   wherein said configuration rewriter reads from said storage means configurational information corresponding to a real number if there is not such a real number corresponding to the logic number determined by said state manager.

6. The data processing device according to claim 4, wherein said configuration rewriter writes in said configurational information storage configurational information corresponding to a real number if there is not such a real number corresponding to the logic number determined by said state manager, and configurational information required in a state subsequent to a state to transit to next.

7. The data processing device according to claim 2, wherein said auxiliary controller stops operation of said arithmetic units with respect to a state transition controlled by said state manager, and resumes operation of said arithmetic units if the configurational information corresponding to the real number is output from said configurational information storage.

8. The data processing device according to claim 7, wherein said auxiliary controller stops operation of said arithmetic units by stopping supplying a clock to said arithmetic units.

9. The data processing device according to claim 7, wherein said auxiliary controller stops operation of said arithmetic units by inhibiting storage elements of said arithmetic units from being rewritten.

10. The data processing device according to claim 7, wherein said auxiliary controller stops operation of said arithmetic units by stopping data from being input from an external port for sending and receiving data between said arithmetic units and an external source.

11. The data processing device according to claim 1, wherein said arithmetic units comprise processor elements, said interconnector including switches.

12. The data processing device according to claim 7, wherein said auxiliary controller comprises a hardwired circuit.

13. The data processing device according to claim 6, wherein said auxiliary controller comprises a logic array.

14. The data processing device according to claim 1, wherein said arithmetic units and said auxiliary controller comprises a logic array.

15. The data processing device according to claim 6, wherein said configuration rewriter writes in said configurational information storage configurational information corresponding to a real number if there is not such a real number corresponding to the logic number requested by said arithmetic units, as configurational information required in a state subsequent to a state to transit to next.

16. The data processing device according to claim 6, wherein said configuration rewriter writes in said configurational information storage configurational information corresponding to a logic number requested by said arithmetic units, as configurational information required in a state subsequent to a state to transit to next.

17. The data processing device according to claim 2, wherein said state manager designates a state which starts to be controlled by said auxiliary controller.

* * * * *